(12) United States Patent
Miyake et al.

(10) Patent No.: US 9,557,605 B2
(45) Date of Patent: Jan. 31, 2017

(54) METHOD OF PRODUCING LIQUID CRYSTAL DISPLAY DEVICE

(75) Inventors: Isamu Miyake, Osaka (JP); Koichi Miyachi, Osaka (JP)

(73) Assignee: Merck Patent GmbH, Darmstadt (DE)

( * ) Notice: Subject to any disclaimer, the term of this patent is extended or adjusted under 35 U.S.C. 154(b) by 533 days.

(21) Appl. No.: 13/879,502

(22) PCT Filed: Oct. 14, 2011

(86) PCT No.: PCT/JP2011/073603
§ 371 (c)(1),
(2), (4) Date: Apr. 15, 2013

(87) PCT Pub. No.: WO2012/050179
PCT Pub. Date: Apr. 19, 2012

(65) Prior Publication Data
US 2013/0196565 A1    Aug. 1, 2013

(30) Foreign Application Priority Data

Oct. 14, 2010  (JP) .................................. 2010-231924
Apr. 6, 2011   (JP) .................................. 2011-084755
Apr. 22, 2011  (JP) .................................. 2011-096524

(51) Int. Cl.
  *G02F 1/13*     (2006.01)
  *G02F 1/1337*   (2006.01)
  *G02F 1/1343*   (2006.01)

(52) U.S. Cl.
  CPC ....... *G02F 1/133788* (2013.01); *G02F 1/1337* (2013.01); *G02F 1/134363* (2013.01); *G02F 2001/133742* (2013.01)

(58) Field of Classification Search
  CPC .......................... G02F 1/133788; G02F 1/1337
  (Continued)

(56) References Cited

U.S. PATENT DOCUMENTS 4,950,795 A    8/1990   Hüsler et al.
5,570,216 A *  10/1996  Lu .................... G02F 1/13718
                                                349/130
(Continued)

FOREIGN PATENT DOCUMENTS

CN    1656413 A      8/2005
CN    101581844 A    11/2009
(Continued)

OTHER PUBLICATIONS

Machine translation of Japanese Patent 2002-294238, date unknown.*

(Continued)

*Primary Examiner* — Jeff Aftergut
(74) *Attorney, Agent, or Firm* — Millen White Zelano and Branigan, PC; John Sopp; Anthony Zelano

(57) ABSTRACT

The present invention provides a method of producing a liquid crystal display device which enables suppression of the occurrence of an electric double layer on a horizontal photo-alignment film before a polymer is formed, and exhibits reduced deterioration of display quality such as image sticking, or reduced display unevenness. The present invention is a method of producing a liquid crystal display device including the steps of (1) forming a liquid crystal layer containing a polymerizable monomer between a first substrate and a second substrate; (2) thermally annealing the liquid crystal layer at a temperature higher by 10° C. or more than the liquid crystalline phase-isotropic phase transition temperature of the liquid crystal layer; (3) forming horizontal alignment films to which the alignment treatment is performed by light irradiation on the first substrate and the second substrate by the time of the step (2); and (4) polymerizing the polymerizable monomer after the step (2).

16 Claims, 6 Drawing Sheets

(58) Field of Classification Search
USPC .......................................................... 156/145
See application file for complete search history.

(56) References Cited

U.S. PATENT DOCUMENTS

| | | | |
|---|---|---|---|
| 5,965,691 A | 10/1999 | Gibbons et al. | |
| 6,177,972 B1 | 1/2001 | Held et al. | |
| 6,201,588 B1 | 3/2001 | Walton et al. | |
| 6,256,082 B1 | 7/2001 | Suzuki et al. | |
| 6,300,926 B1* | 10/2001 | Yoneya ............. | G02F 1/134363 345/87 |
| 6,466,293 B1 | 10/2002 | Suzuki et al. | |
| 6,597,422 B1 | 7/2003 | Fuenfschilling et al. | |
| 7,643,124 B2 | 1/2010 | Pai et al. | |
| 8,647,724 B2 | 2/2014 | Mizusaki et al. | |
| 2002/0098295 A1 | 7/2002 | Yip et al. | |
| 2003/0086044 A1 | 5/2003 | Inoue et al. | |
| 2003/0202143 A1* | 10/2003 | Yoshida ............. | G02F 1/133753 349/123 |
| 2003/0231272 A1 | 12/2003 | Nakamura et al. | |
| 2004/0080685 A1 | 4/2004 | Yamada et al. | |
| 2005/0116200 A1 | 6/2005 | Nakanishi et al. | |
| 2005/0136196 A1 | 6/2005 | Kataoka | |
| 2005/0179006 A1 | 8/2005 | Imamura et al. | |
| 2005/0206809 A1 | 9/2005 | Kim et al. | |
| 2005/0253988 A1 | 11/2005 | Inoue et al. | |
| 2005/0264737 A1 | 12/2005 | Kataoka et al. | |
| 2006/0055858 A1 | 3/2006 | Nakanishi et al. | |
| 2006/0061719 A1 | 3/2006 | Tomioka et al. | |
| 2006/0256258 A1 | 11/2006 | Kim et al. | |
| 2008/0106689 A1* | 5/2008 | Inoue ..................... | C09K 19/22 349/181 |
| 2008/0124493 A1 | 5/2008 | Sawatari et al. | |
| 2008/0179565 A1 | 7/2008 | Hsieh et al. | |
| 2008/0236727 A1 | 10/2008 | Hsieh et al. | |
| 2008/0293888 A1 | 11/2008 | Bachels et al. | |
| 2009/0051854 A1 | 2/2009 | Okabe et al. | |
| 2009/0061117 A1* | 3/2009 | Oyama ................. | G02F 1/1339 428/1.54 |
| 2009/0086139 A1 | 4/2009 | Pai et al. | |
| 2009/0103011 A1 | 4/2009 | Bernatz et al. | |
| 2009/0103034 A1 | 4/2009 | Asada et al. | |
| 2009/0141215 A1 | 6/2009 | Bremer et al. | |
| 2009/0268138 A1 | 10/2009 | Nakamura | |
| 2009/0269515 A1 | 10/2009 | Kataoka | |
| 2009/0324853 A1 | 12/2009 | Bernatz et al. | |
| 2009/0325453 A1* | 12/2009 | Lee ........................ | C09K 19/36 445/58 |
| 2010/0149446 A1 | 6/2010 | Fujisawa et al. | |
| 2011/0043729 A1 | 2/2011 | Nakanishi et al. | |
| 2011/0051049 A1 | 3/2011 | Goetz et al. | |
| 2011/0095229 A1 | 4/2011 | Lee et al. | |
| 2011/0101269 A1 | 5/2011 | Bernatz et al. | |
| 2011/0199566 A1 | 8/2011 | Mazusaki et al. | |
| 2011/0267574 A1 | 11/2011 | Kawahira et al. | |
| 2012/0008079 A1 | 1/2012 | Mizusaki et al. | |
| 2012/0076952 A1 | 3/2012 | Bachels et al. | |
| 2012/0261846 A1 | 10/2012 | Nakanishi et al. | |
| 2012/0262657 A1 | 10/2012 | Nakanishi et al. | |
| 2013/0004679 A1 | 1/2013 | Bachels et al. | |
| 2013/0222740 A1 | 8/2013 | Miyachi et al. | |
| 2013/0271713 A1 | 10/2013 | Miyake et al. | |
| 2013/0335651 A1 | 12/2013 | Lee et al. | |
| 2013/0335652 A1 | 12/2013 | Lee et al. | |
| 2013/0335653 A1 | 12/2013 | Lee et al. | |
| 2014/0111754 A1 | 4/2014 | Matsumoto et al. | |
| 2014/0139794 A1 | 5/2014 | Ohnishi et al. | |

FOREIGN PATENT DOCUMENTS

| | | |
|---|---|---|
| CN | 101646695 A | 2/2010 |
| EP | 1 498 468 A1 | 1/2005 |
| JP | 09-227454 | 9/1997 |
| JP | 10-227998 | 8/1998 |
| JP | 10-268318 | 10/1998 |
| JP | 11-295740 | 10/1999 |
| JP | 2002-38155 A * | 2/2002 |
| JP | 2002-38156 A * | 2/2002 |
| JP | 3337045 | 8/2002 |
| JP | 2002-294238 A * | 10/2002 |
| JP | 2002-532755 | 10/2002 |
| JP | 2003-307720 | 10/2003 |
| JP | 2004-070185 | 3/2004 |
| JP | 2004-286984 | 10/2004 |
| JP | 2005-181582 | 7/2005 |
| JP | 2005-258428 | 9/2005 |
| JP | 2005-266744 | 9/2005 |
| JP | 2005-338613 | 12/2005 |
| JP | 2006-078968 | 3/2006 |
| JP | 2006-215184 | 8/2006 |
| JP | 2006-348227 | 12/2006 |
| JP | 2007-092000 | 4/2007 |
| JP | 2007-114361 | 5/2007 |
| JP | 2008-076950 | 4/2008 |
| JP | 4175826 | 11/2008 |
| JP | 2009-036861 | 2/2009 |
| JP | 2009-64035 | 3/2009 |
| JP | 4237977 | 3/2009 |
| JP | 2009-102639 | 5/2009 |
| JP | 2009-520702 | 5/2009 |
| JP | 2009-132718 | 6/2009 |
| JP | 2009-265266 | 11/2009 |
| JP | 2009-265308 | 11/2009 |
| JP | 2009-300990 | 12/2009 |
| JP | 2010-033093 | 2/2010 |
| JP | 2010-152170 | 7/2010 |
| JP | 2011-515543 | 5/2011 |
| JP | 2011-525553 | 9/2011 |
| TW | I278706 B | 4/2007 |
| TW | 200933267 A | 8/2009 |
| TW | 201009053 A1 | 3/2010 |
| WO | 2006/093131 A1 | 9/2006 |
| WO | WO 2006/123749 | 11/2006 |
| WO | 2009/030322 A1 | 3/2009 |
| WO | WO 2009/118086 | 10/2009 |
| WO | 2009/156118 | 12/2009 |
| WO | 2010/047011 A1 | 4/2010 |
| WO | 2010/079703 A1 | 7/2010 |
| WO | 2010/116564 | 10/2010 |
| WO | WO 2010/116551 | 10/2010 |
| WO | 2012-105479 | 8/2012 |

OTHER PUBLICATIONS

Machine translation of Japanese Patent 2002-38156, date unknown.*
Machine translation of Japanese Patent 2002-38155, date unknown.*
Classification and Examples of Liquid Crystals From the website http://photonicswiki.org.php?title=Classification_and_Examples_of_Liquid_Crystals, 9 pages, dated Jul. 2010.*
U.S. Office Action mailed Feb. 26, 2015 in U.S. Appl. No. 13/879,468.
International Search Report for PCT/JP2009/067569, mailed Jan. 12, 2010.
Notice of Allowance mailed Nov. 25, 2013 in U.S. Appl. No. 13/257,797.
Office Action mailed Jun. 6, 2013 in U.S. Appl. No. 13/257,797.
Restriction Requirement mailed Apr. 2, 2013 in U.S. Appl. No. 13/257,797.
International Search Report with English translation mailed Aug. 14, 2012 in PCT Application PCT/JP2012/065681.
International Search Report with English translation mailed Sep. 25, 2012 in PCT Application PCT/JP2012/069080.
Office Action for U.S. Appl. No. 13/879,447 mailed May 6, 2015; Miyake.
U.S. Office Action mailed Jan. 15, 2015 in U.S. Appl. 13/879,447.
International Search Report for PCT/JP2011/073599, mailed Nov. 29, 2011.
Nagatake et al., "Reduction of EO Hysteresis of Photo-Aligned IPS-LCDs with Polymer Stabilized Method", *Proceedings of the Japanese Liquid Crystal Society Annual Meetings 2010*, Sep. 2010, 2 pages.

(56) References Cited

OTHER PUBLICATIONS

Kikuchi et al., "Polymer-stabilized liquid crystal blue phases", *Nature Materials*, vol. 1., 2002, pp. 64-68.
The Institute of Electronics, "Information and Communication Engineers Technical Research Report", *EID95-17*, vol. 95, 1995, pp. 43-48.
International Search Report issued in Application No. PCT/JP2011/073600 dated Jan. 17, 2012.
Nagatake, Y., et al., "Research on the Improvement of Hysteresis Characteristics of Optical Alignment LCD Using Polymer Stabilization Technique," Lecture Proceedings of the Japanese Liquid Crystal Society Forum 2010, The Japanese Liquid Crystal Society, (Aug. 27, 2010), Lecture No. 2B02.
Nagatake, Y., et al., "Hysteresis Reduction in EO Characteristics of Photo-Aligned IPS-LCDs with Polyer-Surface-Stabilized Method," IDW' 10:Proceedings of the 17$^{th}$ International Display Workshops, IDW' 10 Publication Committee, (2010) LCT p. 2-5, pp. 89-92.
International Search Report for PCT/JP2011/073603 mailed Nov. 29, 2011.
Y. Momoi et al., P-131: New Model of Image Sticking Mechanism on Long Period AC Field of IPS Mode, SID 09 Digest, 2009, pp. 1161-1164.
Office Action for U.S. Appl. No. 13/879,447 mailed Jan. 15, 2015; Miyake et al.
Office Action for U.S. Appl. No. 13/879,447 mailed Nov. 5, 2015; Miyake.
Office Action for U.S. Appl. No. 13/879,468 mailed Oct. 23, 2015; Miyachi.
Advisory Action for U.S. Appl. No. 13/879,447 mailed Sep. 16, 2015; Miyake.
Office Action for U.S. Appl. No. 13/879,468 mailed Apr. 7, 2016; Miyachi.
Advisory Action dated Mar. 10, 2016 for U.S. Appl. No. 13/879,468; Miyachi.

\* cited by examiner

METHOD OF PRODUCING LIQUID CRYSTAL DISPLAY DEVICE

This application is the U.S. national phase of International Application No. PCT/JP2011/073603 filed 14 Oct. 2011 which designated the U.S. and claims priority to JP 2010-231924 filed 14 Oct. 2010, JP 2011-084755 filed 6 Apr. 2011, and JP 2011-096524 filed 22 Apr. 2011, the entire contents of each of which are hereby incorporated by reference.

TECHNICAL FIELD

The present invention relates to a method of producing a liquid crystal display device. More particularly, the present invention relates to a method of producing a liquid crystal display device by forming a polymer on a horizontal alignment film formed by a photo-alignment treatment.

BACKGROUND ART

A liquid crystal display (LCD) device is a display device which controls the transmission/shielding of light (on/off of the display) by controlling the alignment of liquid crystal molecules having birefringent properties. Examples of the display mode of LCD include a vertical alignment (VA) mode in which liquid crystal molecules having negative anisotropy of dielectric constant are vertically aligned with respect to the substrate surface; an in-plane switching (IPS) mode and a fringe field switching (FFS) mode in which liquid crystal molecules having positive or negative anisotropy of dielectric constant are horizontally aligned with respect to the substrate surface, and a horizontal electric field is applied to the liquid crystal layer.

Among these, particularly liquid crystal display devices of the IPS mode or the FFS mode have an advantage of having a wide viewing angle, and the like, while these liquid crystal display devices are known to be likely to have the occurrence of display defects such as image sticking (refer to, for example, Patent Literature 1 and Non Patent Literature 1). Furthermore, it is known that in a liquid crystal display device, when an electric double layer is generated between an alignment film and a liquid crystal layer, image quality deterioration occurs (for example, Patent Literature 2).

CITATION LIST

Patent Literature

Patent Literature 1: JP-A-2010-152170
Patent Literature 2: Japanese Patent No. 3337045

Non Patent Literature

Non Patent Literature 1: Momoi, et al., "SID 09 DIGEST", 2009, p. 1611

SUMMARY OF INVENTION

Technical Problem

The present inventors have carried out research on a photo-alignment technology of enabling the control of liquid crystal alignment under no voltage application even if a rubbing treatment is not applied to an alignment film. The photo-alignment technology is a technology of irradiating a film which is formed by using a light-active material as the material of an alignment film, with light such as ultraviolet rays, and thereby causing the film to have an alignment regulating force. According to the photo-alignment technology, since an alignment treatment can be carried out on a film surface in a non-contact manner, the occurrence of contaminants, waste and the like during the alignment treatment can be suppressed, and unlike rubbing, the technology can be applied even to large-sized panels. An alignment film to which the alignment treatment is performed by the photo-alignment technology is also called a photo-alignment film.

However, the current photo-alignment technology has not been adopted for the mass production of TV sets and the like of a type using a horizontal alignment film, such as the IPS mode. This is because when a horizontal alignment film formed by the photo-alignment technology (hereinafter, also referred to as a horizontal photo-alignment film) is used in a liquid crystal display of the IPS mode or the like, image sticking occurs in a conspicuous manner. This image sticking is a phenomenon in which when an AC voltage is continuously applied for a certain time to a portion of a liquid crystal cell, brightness appears to be different between a portion where the AC voltage is not applied and a portion where the AC voltage is applied. This is considered as a memory phenomenon in which liquid crystal molecules or the alignment film molecules undergo physical alignment deformation by the application of an AC voltage. In the horizontal photo-alignment film, this memory phenomenon is particularly conspicuous, and this is attributable to the significantly weak anchoring force of the horizontal photo-alignment film.

Based on this finding, the present inventors conducted an investigation to reduce the image sticking in a liquid crystal display device using a horizontal photo-alignment film, and the present inventors found that when a polymer formation treatment (hereinafter, also referred to as PS treatment) is carried out by applying an alignment stabilization technology using a polymer (hereinafter, also referred to as a polymer sustained (PS) technology), image sticking is reduced.

However, there have been numerous occasions in which when a liquid crystal display device that includes a horizontal photo-alignment film and has been subjected to the PS treatment is performed to actually perform display, the phenomenon in which unevenness of brightness, in other words, unevenness in the liquid crystal alignment direction occurs. In order to investigate a reason for this in detail, the following experiment was conducted regarding the display unevenness in a liquid crystal panel which included a horizontal photo-alignment film made by using polyvinyl cinnamate as an alignment film material and had not been subjected to PS treatment (hereinafter, also referred to as a "liquid crystal panel for experiment"). 1) Unevenness in display was confirmed only by performing DC application at about 5 V to the electrodes of a liquid crystal panel for experiment for several seconds. 2) Unevenness in display was confirmed even when the surface of the liquid crystal panel for experiment was rubbed with a finger, the liquid crystal panel surface was electrically charged, and then removal of electricity was conducted with an ionizer static eliminator. This unevenness of display was quite persistent. Similarly, 5 V DC was applied for 5 minutes to the liquid crystal panel for experiment to generate unevenness in display, subsequently the electrodes were short-circuited, and the inter-electrode potential was floated. As a result, as shown in FIG. 7, the unevenness in display was not sufficiently mitigated even after the passage of a long time period (8 hours). From the results described above, it was found that when a PS treatment for preventing image sticking is performed, 1) if the panel is statically charged, the alignment of the liquid crystal layer is disordered by the DC application induced by charging, and this alignment disorder is fixed by the PS treatment, so that display defect occurs; 2) furthermore, although it is more or less effective to perform a charge removal treatment in the production process, if the panel is charged even once, an electric double layer is generated in the horizontal photo-alignment film, and this electric double layer cannot be removed only by a charge removal treatment. This electric double layer has an action of disrupting the liquid crystal alignment because DC is applied to the liquid crystal layer. For this reason, there is a demand for a method of realizing uniform alignment by performing a charge removal treatment before the PS treatment to remove static electricity, and at the same time, completely relieving the electric double layer.

Regarding the charge removal treatment, well known treatments include formation of a transparent electrode on the panel surface, elimination of charge by an ionizer static eliminator, and irradiation of soft X-rays. However, a method of relieving an electric double layer that has been generated in the horizontal photo-alignment film is not known. The present inventors found that as high voltage DC is applied to liquid crystals and a horizontal photo-alignment film, there is a possibility that impurity ions contained in the horizontal photo-alignment film may leach out into the liquid crystal layer and this leads to generation of an electric double layer. Furthermore, the present inventors also found a possibility that the horizontal photo-alignment film itself may be highly polarized and act as an electric double layer. For any of these reasons, it is difficult in view of a production process to avoid accumulation of charge in a liquid crystal panel (liquid crystal cell). Therefore, it was made clear that the fundamental causative factor is the characteristic nature of the liquid crystal display device using a horizontal photo-alignment film, in which even though a charge removal treatment is carried out, if an electric double layer is once formed, the horizontal photo-alignment film is highly polarized so as to cause alignment disorder.

Here, generation of the electric double layer will be described in detail by using FIG. 9 to FIG. 11. As illustrated in FIG. 9, because of the charge caused by static electricity at the surface of the substrate (surface on the opposite side of the liquid crystal layer side), the impurity ions present in the liquid crystal layer or the alignment film form an electric double layer in the vicinity of the substrate or the alignment film, and exert adverse influence on the alignment control of the liquid crystal molecules. Furthermore, as illustrated in FIG. 10, due to the charge generated on the back surface of the substrate (liquid crystal layer side), a potential difference occurs between substrates, and as a result, an electric double layer is generated. Furthermore, as illustrated in FIG. 11, even though a potential difference occurs between electrodes, an electric double layer is generated.

The present invention has been made in view of the current situation as described above, and it is an object of the present invention to provide a method of producing a liquid crystal display device with reduced deterioration of the display quality such as image sticking, or reduced display unevenness.

In addition, in regard to a liquid crystal display device of the IPS mode including an alignment film formed by rubbing, it is known that image sticking occurs even when an AC voltage without an offset is applied (refer to, for example, Non Patent Literature 1). However, this is attributable to weak anchoring of the alignment film, and this is a physical alignment deformation of liquid crystal molecules and alignment film molecules, without any intervention of impurity ions. Therefore, for an AC voltage that does not in principle cause deviation of charge, the formation of an electric double layer does not fully occur, and the AC voltage has no relevance to the problem of the present invention.

Solution to Problem

In general, it is believed that when the temperature of the liquid crystal layer increases in a state of DC application, an electric double layer is more easily formed (for example, Patent Literature 2). However, the present inventors conducted a further investigation, and as a result, the present inventors found that in order to remove an electric double layer of an electrically floating liquid crystal cell in which a horizontal photo-alignment film is used, in contrast, it is effective to thermally anneal the liquid crystal cell. Particularly, the present inventors found that by heating in an isotropic phase at a temperature higher by 10° C. or more than the liquid crystalline phase-isotropic phase transition temperature of the liquid crystal layer, 1) mobility of the ions constituting the electric double layer in the isotropic phase significantly increases, and ions diffuse, so that detachment from the photo-alignment film interface proceeds; 2) electrical conductivity of the liquid crystal itself in the isotropic phase increases; and 3) a photo-alignment film having a conductivity higher than that of conventional alignment films can easily conduct the charge of the electric double layer and move the charge. Thus, the present inventors conceived that the problems described above can be satisfactorily solved, and achieved the present invention.

That is, an aspect of the present invention is a method of producing a liquid crystal display device (hereinafter, also referred to as a method of producing a liquid crystal display device of the present invention) including the steps of: (1) forming a liquid crystal layer containing a polymerizable monomer between a first substrate and a second substrate; (2) thermally annealing the liquid crystal layer at a temperature higher by 10° C. or more than the liquid crystalline phase-isotropic phase transition temperature of the liquid crystal layer; (3) forming horizontal alignment films to which the alignment treatment is performed by light irradiation, on the first substrate and the second substrate by the time of step (2); and (4) polymerizing the polymerizable monomer after step (2).

The method of producing a liquid crystal display device of the present invention is not particularly limited by other steps so long as these steps are essentially included.

Hereinafter, a preferred embodiment of the method of producing a liquid crystal display device of the present invention, and the method of producing a liquid crystal display device of the present invention will be described in detail.

The first substrate and the second substrate are substrates for interposing the liquid crystal layer, by using an insulating substrate made of, for example, glass, a resin or the like as a parent body, and are formed by a process of fabricating a wiring, electrodes, a color filter and the like on the insulating substrate. However, one of the first substrate and the second substrate may include only an insulating substrate.

The method of forming the horizontal alignment film is not particularly limited, but usually, first, a precursor film of the horizontal alignment film is formed on the first substrate and the second substrate before the step (1), and then the precursor film is subjected to an alignment treatment by light irradiation (photo-alignment treatment). More suitably, first, a varnish is prepared by adding a solvent to the material of the horizontal alignment film, and the varnish is coated on the first substrate and the second substrate. Next, the varnish is dried, the solvent component is volatilized, and thus a coating film is formed. Finally, a photo-alignment treatment is carried out. Drying may be carried out in plural stages (for example, prebake and post-bake). For the coating of the varnish, for example, a spin coating method or a flexographic printing method is used. In the horizontal alignment film, the liquid crystal in the vicinity of the film are aligned in parallel or in approximate parallel to the film surface. The horizontal alignment film may or may not be a film which imparts a pretilt angle to the liquid crystal molecules; however, in the case of applying the present invention to a method of producing a liquid crystal display device in a horizontal electric field system that will be described below, it is usually unnecessary to impart the pretilt angle. The horizontal alignment film may include plural regions having alignment directions that are different from each other. That is, liquid crystal may have the alignment divided, but in the case of applying a horizontal electric field system, the alignment direction of the horizontal alignment film is usually substantially the same over the entire surface of the film. The alignment direction of the horizontal alignment film can be controlled by adjusting the kind of the light irradiated, irradiation time, irradiation intensity, kind of the photofunctional group, and the like. Thus, the method of performing the step (3) before the step (1) has been explained, but it is desirable that the step (3) is completed by the time of the step (2), and for example, the step (3) may also be completed after the step (1). Specifically, for example, the horizontal alignment film may be formed by first forming a precursor film of the horizontal alignment film on a first substrate and a second substrate, subsequently carrying out the step (1), and then subjecting the precursor film to an alignment treatment by light irradiation. Furthermore, it is also acceptable to form the horizontal alignment film by coating a varnish on a first substrate and a second substrate, subsequently performing drying (for example, prebake and post-bake), forming a coating film by volatilizing the solvent component of the varnish, subsequently carrying out the step (1), and then subjecting the coating film to an alignment treatment by light irradiation.

The horizontal alignment film is a horizontal photo-alignment film since the alignment treatment is performed by light irradiation to the horizontal alignment film. The horizontal photo-alignment film is a polymer film having the properties of causing anisotropy to the film by polarized or non-polarized irradiation, and causing the liquid crystals to have an alignment regulating force. More preferably, the horizontal photo-alignment film is in the form of a photo-alignment film to which the alignment treatment is performed by ultraviolet rays, visible light, or both of these. The size of the pretilt angle that is imparted to the liquid crystal molecules by the horizontal photo-alignment film can be adjusted by the kind of light, light irradiation time, irradiation direction, irradiation intensity, kind of the photofunctional group, and the like. Meanwhile, in the method of producing a liquid crystal display device of the present invention, suitably, a polymer layer (PS layer) that will be described below is formed, and as a result, the alignment can be fixed. Therefore, there is no need to prevent ultraviolet rays or visible light from entering the liquid crystal layer after the production process, and thus the range of selection of the production process is broadened. In addition, the horizontal photo-alignment film may have a property of aligning liquid crystals perpendicularly to the irradiation polarization, and in that case, when the horizontal photo-alignment film are irradiated with p-polarized light in a normal direction of the substrate or in an oblique direction to the substrate, the pretilt angle usually becomes 0°.

The horizontal alignment film material (material that constitutes the horizontal alignment film) may be a single polymer or a mixture containing other molecules, so long as the material has the properties described above. For example, the material may also be in a form in which other low molecular weight molecules such as an additive or other photo-inactive polymers are contained in a polymer containing a functional group capable of photo-alignment. As the horizontal alignment film material, usually a material which causes a photo-decomposition reaction, a photo-isomerization reaction, or a photo-dimerization reaction is selected. As compared to the photo-decomposition reaction, the photo-isomerization reaction and the photo-dimerization reaction are generally capable of alignment at a longer wavelength with a smaller exposure dose, and therefore exhibit excellent mass productivity. That is, it is preferable that the horizontal alignment film contains a functional group which is capable of a photo-reaction of photo-isomerization type or photo-dimerization type. Representative materials that cause a photo-isomerization reaction or photo-dimerization reaction include azobenzene derivatives, cinnamoyl derivatives, chalcone derivatives, cinnamate derivatives, coumarin derivatives, diarylethene derivatives, stilbene derivatives, and anthracene derivatives. A material of photo-isomerization type or photo-dimerization type is preferably a cinnamate group or derivatives thereof. In other words, the horizontal alignment film suitably contains a functional group including a cinnamate derivative. The benzene ring contained in such a functional group may be a heterocyclic ring. Representative materials that cause a photo-decomposition reaction include materials including a cyclobutane skeleton, and examples include polyimides containing cyclobutane rings. It is one of preferred embodiments of the method of producing a liquid crystal display device of the present invention that the horizontal alignment film material contains a cyclobutane skeleton in the repeating unit.

The kind of the polymerizable monomer included in the liquid crystal layer is not particularly limited, and for example, conventionally known monomers that are used in the PS technology can be used. The polymerizable functional group of the polymerizable monomer is not particularly limited, but the polymerizable functional group is preferably an acrylate group, a methacrylate group, a vinyl group, a vinyloxy group, or an epoxy group. Furthermore, in the step (4), the polymerization methods and the polymerization conditions (reaction time, reaction temperature, presence or absence of voltage application, and the like) are not particularly limited, and for example, the polymerization methods and polymerization conditions that are employed in conventional PS technologies can be applied. However, there are cases in which a thermal polymerization type polymerizable monomer cannot be applied. This is because there is a risk that the polymerizable monomer may undergo polymerization at the time of thermal annealing of the liquid crystal layer that is carried out in the step (2). Therefore, a polymerizable monomer which uses thermal polymerization and photopolymerization in combination (for example, a thermal polymerization type monomer which uses a photoinitiator in combination), with which polymerization of the monomer does not proceed in the presence of heat only, but polymerization of the monomer proceeds when light irradiation and heating are simultaneously carried out, can be applied to the present invention. Furthermore, the polymerizable monomer is a photopolymerizable monomer and is preferably polymerized by light irradiation. Thereby, the polymerization reaction can be initiated easily at normal temperature. Also, the occurrence of polymerization during the step (2) can be effectively prevented. The light used in photopolymerization is preferably ultraviolet rays, visible light, or both of these. Meanwhile, the polymerizable monomer may be composed of one kind or may be composed of two or more kinds. The amount of the polymerizable monomer added is not particularly limited, and for example, the amount can be set at the addition amount employed in conventional PS technologies.

The polymerization reaction of the polymerizable monomer is not particularly limited, and "sequential polymerization" in which a bifunctional monomer is converted gradually to a polymer by making new bonds, and "chain polymerization" in which monomers continuously bond to the molecules of an active species generated from a small amount of a catalyst (initiator), and the polymer grows by a chain reaction, are all included. Examples of the sequential polymerization include polycondensation, polyaddition, and the like. Examples of the chain polymerization include radical polymerization, ionic polymerization (anionic polymerization, cationic polymerization and the like), and the like.

As a result of the step (4), suitably, a polymer layer (PS layer) is formed on the horizontal alignment film. The polymer layer can enhance the alignment regulating force of the horizontal alignment film. Therefore, the occurrence of image sticking caused by AC application is greatly reduced, and the display quality can be greatly improved. In addition, the PS layer may be formed on one surface of the horizontal alignment film, or may be formed in a dot shape on the horizontal alignment film. Also, the PS layer may also be formed at least partially on the horizontal alignment film, and then further formed in a network form over the entire liquid crystal layer.

The average molecular weight of the PS layer is not particularly limited, and may be of the same range as the number average molecular weight or weight average molecular weight of those polymers formed by conventional PI technologies. Typically, for example, a number of repeating units of 8 or more, or a molecular weight of 1000 or more is preferred.

The liquid crystal layer is formed from a liquid crystal composition containing the polymerizable monomer and liquid crystal molecules (liquid crystal material). The kind of the liquid crystal molecules is not particularly limited, but conventionally, the liquid crystal layer contains liquid crystal molecules exhibiting the nematic phase (nematic liquid crystals). The liquid crystal molecules may be any of liquid crystal molecules exhibiting positive anisotropy of dielectric constant (positive type) and liquid crystal molecules exhibiting negative anisotropy of dielectric constant (negative type).

Furthermore, in the liquid crystal layer, one kind of liquid crystal molecules may be present, or plural kinds of liquid crystal molecules may be present. For the purpose of securing reliability, enhancing the response time, and adjusting the liquid crystalline phase temperature range, elastic constant, anisotropy of dielectric constant and refractive index anisotropy, a mixture of plural kinds of liquid crystal molecules can be used.

Among them, it is preferable that the liquid crystal layer contains liquid crystal molecules containing a multiple bond other than the conjugated double bonds of a benzene ring in the molecule structure (hereinafter, also referred to as multiple bond-containing molecules). Thereby, the multiple bonds of the liquid crystal molecules themselves can be activated by light, and therefore, the progress of the polymerization reaction of monomers in the step (4) can be accelerated. Furthermore, since the liquid crystal molecules can serve as a carrier capable of transfer of activation energy or radicals, the progress of the polymerization reaction of monomers in the step (4) can be accelerated. In addition, the multiple bond-containing liquid crystal molecules may contain conjugated double bonds of a benzene ring so long as the liquid crystal molecules contains a multiple bond other than the conjugated double bonds of a benzene ring, and these bonds are not intended to be particularly excluded.

The multiple bond is preferably a double bond, and preferably is included in an ester group or an alkenyl group. Since the double bond, particularly a double bond included in an ester group or an alkenyl group, has excellent reactivity, the progress of the polymerization reaction is further accelerated, and a polymer layer can be stably formed. The multiple bond may be a triple bond, and in that case, the triple bond is preferably included in a cyano group. Since a triple bond included in a cyano group has excellent reactivity, the progress of the polymerization reaction can be further accelerated, and a polymer layer can be stably formed. As such, when a polymer layer is stably formed, the effects of the present invention together with other constitutions of the present invention are more effectively exhibited. Also, the liquid crystal molecules preferably contain two or more kinds of the multiple bonds. This is because in order to adjust the property values of a liquid crystal (for example, Tni: nematic phase-isotropic phase transition temperature, Δn: refractive index anisotropy, Δ∈: anisotropy of dielectric constant, ∈: dielectric constant, K1, K3: liquid crystal elastic constants, γ1: rotational viscosity) to desired property values according to the use, plural kinds of liquid crystal molecules need to be mixed; however, if there are plural kinds of double bonds, the degree of freedom to obtain desired property values of the liquid crystals increases.

The alkenyl group is represented by general formula: $C_nH_{2n-1}$, and examples thereof include $CH_2$=CH— and $CH_3$—CH=CH—.

The liquid crystal molecules preferably contain at least one molecule structure selected from the group consisting of the following formulae (17-1) to (17-6). Particularly preferably, the liquid crystal molecules contain a molecule structure containing the following formula (17-4).

[Chem. 1]

(17-1)

(17-2)

(17-3)

(17-4)

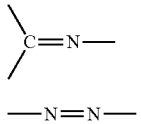

(17-5)

—N═N— (17-6)

The liquid crystalline phase-isotropic phase transition temperature of the liquid crystal layer is determined by heating a liquid crystal cell and measuring the temperature at which birefringence disappears. That is, the temperature at which birefringence disappears corresponds to the liquid crystalline phase-isotropic phase transition temperature. Meanwhile, heating of the liquid crystal cell is carried out at a rate lower than 5° C./min. Furthermore, the process time of the step (2) is not particularly limited, but the process time is suitably 1 minute or longer (more suitably 5 minutes or longer, and particularly suitably 10 minutes or longer), and 240 minutes or shorter (more suitably 120 minutes or shorter, and particularly suitably 60 minutes or shorter). Furthermore, the temperature of thermal annealing in the step (2) is also not particularly limited so long as it is a temperature higher by 10° C. or more than the liquid crystalline phase-isotropic phase transition temperature of the liquid crystal layer, but in consideration of the overall heat resistance of the materials that form the liquid crystal cell, the temperature of thermal annealing is preferably 200° C. or lower.

The method of forming the liquid crystal layer is not particularly limited; however, the method is preferably carried out such that in the step (1), a sealing material which involves heat in curing is applied on at least one of the first substrate and the second substrate (more suitably, one of the first substrate and the second substrate), a material of the liquid crystal layer (liquid crystal composition) is dropped on the first substrate or the second substrate, and the first substrate and the second substrate are bonded together to each other so that the sealing material and the material are interposed therebetween, to thereby form the liquid crystal layer; and in the step (2), the liquid crystal layer is thermally annealed, and at the same time, the sealing material is cured. Thereby, the sealing material can be cured by utilizing the heat used in the process of thermally annealing the liquid crystal layer. Meanwhile, the liquid crystal composition is usually (i) dropped within a region that is on the substrate where the sealing material has been applied and is surrounded by the sealing material, or (ii) not dropped on the substrate where the sealing material has been applied, but is dropped on the substrate where the sealing material is not applied. In the case of (ii), the liquid crystal composition is dropped within the region which corresponds to the region that is on the substrate where the sealing material has been applied and is surrounded by the sealing material.

That is, in the method of producing a liquid crystal display device of the present invention, the one drop fill process (ODF) in which a liquid crystal material is dropped on one of the substrates and the other substrate is bonded thereon, can be applied.

At this time, it is preferable that the method of producing a liquid crystal display device of the present invention further include the step of: forming a pixel electrode and a common electrode on the first substrate or the second substrate, wherein a gap is present between the pixel electrode and the common electrode in a planar view, and in the step (1), the first substrate or the second substrate is adsorbed to an electrostatic chuck in a vacuum, and thereby the first substrate and the second substrate are bonded to each other. When bonding of the substrates is performed in a vacuum, vacuum adsorption is not applicable to retain the substrates, and an electrostatic chuck which generates a high voltage and adsorbs the substrates by means of electrostatic interaction is suitably used. The electric field generated from the electrostatic chuck is shielded by the electrodes formed on the substrates, such as a pixel electrode and a common electrode. However, when there is a gap between the pixel electrode and the common electrode in a planar view, the electric field generated from the electrostatic chuck is not completely shielded, and an electric field is applied to the liquid crystal layer or a photo-alignment film. As a result, an electric double layer is formed, and there occurs display unevenness in which alignment of the liquid crystals is disordered. Therefore, it is necessary to carry out a certain treatment that solves the problem of disorder in the alignment of the liquid crystals after bonding of the substrates. On the other hand, according to the method of producing a liquid crystal display device of the present invention, since the electric double layer is removed by thermally annealing the liquid crystal layer at a temperature higher by 10° C. or more than the liquid crystalline phase-isotropic phase transition temperature of the liquid crystal layer, the electrostatic chuck can also be suitably used in the production of a liquid crystal display device in which there is a gap between the pixel electrode and the common electrode in a planar view.

At this time, it is preferable that the pixel electrode and the common electrode are a pair of combteeth electrodes. In the production of a liquid crystal display device including a pair of combteeth electrodes as a pixel electrode and a common electrode, such as a liquid crystal display device of the IPS mode, display unevenness can be suppressed by using an electrostatic chuck. Furthermore, the pixel electrode and the common electrode may be fishbone-shaped electrodes including a stem and plural branches extending from the stem, or may be electrodes including slits formed on planar electrodes.

Furthermore, the pixel electrode and the common electrode are preferably transparent electrodes. For example, in the case where one of a pair of substrates includes a color filter, and the other includes the pixel electrode and the common electrode, it is preferable that ultraviolet rays is irradiated through the side of the other substrate that does not include a color filter in order to polymerize monomers. However, if the pixel electrode and the common electrode that are present on the other substrate exhibit light-shielding properties, this leads to inefficient polymerization of monomers.

The sealing material is not particularly limited so long as it is a sealing material which involves heat in curing, and for example, a sealing material which is cured by a polymerization reaction under heating, a sealing material which is cured by a polymerization reaction induced by ultraviolet rays and also has the polymerization reaction accelerated by heat, and the like can be used. Especially, from the viewpoint of curing the sealing material more firmly and improving the quality of the liquid crystal display device, a sealing material having both thermal curability and ultraviolet curability is preferred. At this time, the temperature of the thermal annealing is preferably a temperature which is higher by 10° C. or more than the phase transition temperature of the liquid crystal layer and at which the sealing material can be cured.

The method of producing a liquid crystal display device of the present invention preferably further includes a step of subjecting the first substrate and/or the second substrate to an electric charge removal treatment by using a static eliminator equipment. By combining the electric charge removal treatment and the annealing, the electric double layer can be particularly effectively solved before the polymer formation.

The electric charge removal treatment means a treatment of removing static electricity charged on the first substrate and/or the second substrate, and examples include a treatment of electrically neutralizing static electricity by spraying ions having a polarity that is opposite to the charged static electricity, to the first substrate and/or the second substrate by using an ionizer static eliminator as a static eliminator equipment; and a treatment of short-circuiting plural electrodes formed on the substrate by using an equipment which temporarily connects a terminal with another terminal through wiring.

The timing of performing this electric charge removal treatment is not particularly limited, but it is preferable to perform the electric charge removal treatment before the PS polymerization treatment (step (4)), it is more preferable to perform the treatment immediately before thermal annealing (step (2)), and it is particularly preferable to perform the treatment immediately before the PS polymerization treatment and immediately before thermal annealing, respectively. This is because although an electric double layer can be removed by thermal annealing, if static charge that causes the formation of an electric double layer is not removed before the thermal annealing, there is a risk that an electric double layer may be formed again after the thermal annealing.

The method of producing a liquid crystal display device of the present invention preferably further includes a step of forming a conductive film on the surface on the opposite side of the liquid crystal layer side of at least one of the first substrate and the second substrate; and more preferably includes a step of forming a conductive film respectively on both the first substrate and the second substrate. Thereby, the problem of static charge electrification on the first substrate and the second substrate can be solved more reliably before the formation of a polymer. In addition, in the case of performing an electric charge removal treatment using an ionizer or the like before the annealing treatment, the timing for performing the step of forming a conductive film is not particularly limited. However, if an electric charge removal treatment is not performed before the annealing treatment, it is preferable that the conductive film is formed before the PS treatment, and it is more preferable that the conductive film is formed before the thermal annealing.

The liquid crystal mode of the liquid crystal display device produced according to the method of producing a liquid crystal display device of the present invention is not particularly limited so long as the liquid crystal mode is applicable to a liquid crystal display device which includes a horizontal photo-alignment film and is capable of utilizing the PS technology, and for example, a twisted nematic (TN) mode, an optically compensated birefringence (OCB) mode, a super twisted nematic (STN) mode, a ferroelectrics liquid crystal (FLC) mode, a polymer dispersed liquid crystal (PDLC) mode, a polymer network liquid crystal (PNLC) mode and the like, all of which include horizontal photo-alignment films, are applied. However, preferably, a horizontal electric field system such as the IPS mode or the FFS mode is applied. Furthermore, the FLC mode or the PDLC mode is also preferred. When these modes are applied, desired alignment can be achieved with one-time polarized light irradiation at the front surface of the substrate, and therefore, the process is simple, while mass productivity is excellent. In regard to the OCB mode, TN mode and STN mode, when pretilt is to be exhibited by the method of Examples that will be described below, irradiation in two steps in total, namely, first polarized light irradiation at the front surface of the substrate, and second polarized light irradiation that is performed in an oblique direction after rotating the first polarized surface by 90°, is needed. Furthermore, more preferably, a horizontal electric field mode such as the IPS mode or the FFS mode is applicable. In the FLC mode, since the viscosity of the liquid crystals is high, it is difficult to form a liquid crystal layer by a liquid crystal dropping method or a liquid crystal injection method, which are general methods currently used. Furthermore, in the PDLC mode, the contrast ratio is lowered in principle. From the viewpoint described above, the method of producing a liquid crystal display device of the present invention is preferably a method of producing a liquid crystal display device of a horizontal electric field system. According to the method of producing a liquid crystal display device of the present invention, a liquid crystal display device of a horizontal electric field system such as the IPS mode or the FFS mode can be suitably produced.

From the viewpoint of easily realizing the FFS mode, it is preferable that the first substrate or the second substrate includes a pixel electrode and a common electrode, one of the pixel electrode and the common electrode (hereinafter, also called a first electrode) includes plural linear portions that are arrayed with gaps between them within a pixel, and the other of the pixel electrode and the common electrode (hereinafter, also called a second electrode) face the gaps.

The first electrode may be a combteeth electrode, or may be an electrode having longitudinal-shaped openings (slits) formed thereon (slitted electrode). In the case of the former, the plural linear portions correspond to the combteeth of the combteeth electrode.

Meanwhile, in the present specification, a combteeth electrode refers to an electrode including plural combteeth and a portion that connects the single ends of the plural combteeth on one side. The shape of one combtooth is not limited so long as it is linear-shaped.

The plural linear portions are usually arranged in parallel to each other. The plural linear portions may be in a linear-shaped form, or may be in a zigzag-shaped or V-shaped form.

The planar shape of the second electrode is not particularly limited, so long as at least the second electrode faces the gaps; however, it is preferable that the second electrode include a shape of covering at least the pixel region. In addition, usually, the second electrode may be located in a lower layer than the first electrode. In this case, generally, an insulating film is formed on the second electrode, and the first electrode is arranged on the insulating film.

Advantageous Effects of Invention

According to the present invention, a liquid crystal display device in which deterioration of the display quality such as image sticking or display unevenness is reduced can be produced.

DESCRIPTION OF EMBODIMENTS

Figure 1:
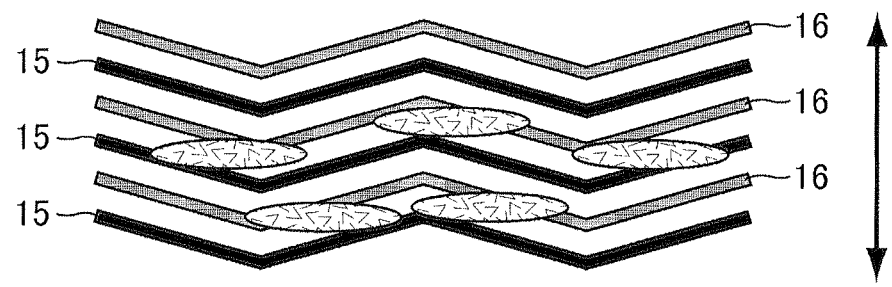
FIG. 1 is a schematic plane view illustrating an array substrate of a liquid crystal display device produced according to the method of producing a liquid crystal display device according to Embodiment 1.

The present invention will be mentioned in more detail referring to the drawings in the following embodiments, but is not limited to these embodiments. Furthermore, in the following embodiments, a method of producing a liquid crystal display device of the IPS mode is explained, but the present invention is not limited to this. For example, the present invention is also applied to the production of a liquid crystal display device of the FFS mode, TN mode, OCB mode, STN mode, FLC mode, PDLC mode or PNLC mode, all of which include horizontal photo-alignment films.

Embodiment 1

The method of producing a liquid crystal display device according to Embodiment 1 will be described in detail. The liquid crystal display device produced according to Embodiment 1 is a liquid crystal display device of the so-called IPS mode, and as illustrated in FIG. 1, pixel electrodes 15 and common electrodes 16 are extended approximately in parallel to each other, while the respective electrodes are formed in a zigzag form. Thereby, when an electric field is applied, the electric field vector is approximately perpendicular to the length direction of the electrodes, and therefore, a multi-domain structure is formed, while satisfactory viewing angle characteristics can be obtained. In addition, the pixel electrodes 15 and the common electrodes 16 may also be formed respectively in a linear form, instead of being formed in a zigzag form. The two arrows in FIG. 1 indicate the directions of irradiation polarization (in the case of using positive type liquid crystal molecules). Meanwhile, in the case of using negative type liquid crystal molecules, the directions of irradiation polarization are directions that are perpendicular to the directions of irradiation polarization shown in FIG. 13.

[Array Substrate and Color Filter Substrate Forming Step]

Figure 2:
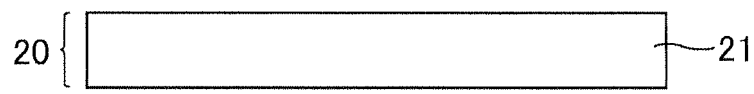
FIG. 2 is a schematic cross-sectional view for illustrating the method of producing a liquid crystal display device according to Embodiment 1, which is a schematic cross-sectional view after an array substrate and color filter substrate forming step.
Figure 2:
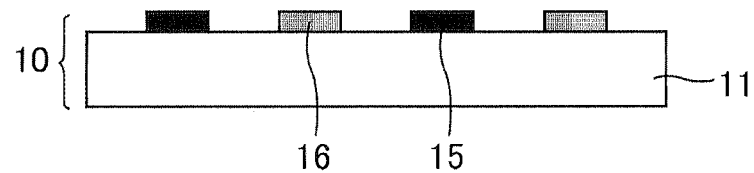

As shown in FIG. 2, first, an array substrate (first substrate) 10 is formed by forming various wirings, a pixel electrode 15, a common electrode 16, TFT and the like on an insulating transparent substrate 11 formed of a material such as glass. Also, a color filter substrate (second substrate) 20 is formed by forming color filters, a black matrix and the like on an insulating transparent substrate 21 formed of a material such as glass. In addition, the liquid crystal display device produced according to Embodiment 1 is a liquid crystal display device of the so-called IPS mode, and while the pixel electrode 15 and the common electrode 16 are together formed in a combteeth-shaped, the common electrode 16 may be formed in a planar form so as to cover the pixel region. The liquid crystal display device may also be a liquid crystal display device of the so-called FFS mode. In this case, the common electrode 16 is formed in the lower layer of the pixel electrode 15, with an insulating film interposed therebetween. Furthermore, the pixel electrode 15 may be formed in a shape having slits.

There are no particular limitations on the materials of the pixel electrode 15 and the common electrode 16, and for example, light-shielding materials such as aluminum can be used, but translucent materials such as indium tin oxide (ITO), indium zinc oxide (IZO), zinc oxide (ZnO), and fluorine-doped tin oxide (FTO) are suitably used. The pixel electrode 15 and the common electrode 16 are formed by a step of forming transparent thin film electrodes by a sputtering method, and shaping the transparent thin film electrodes into desired shapes by a photolithographic method.

[Conductive Film Forming Step]

Figure 3:
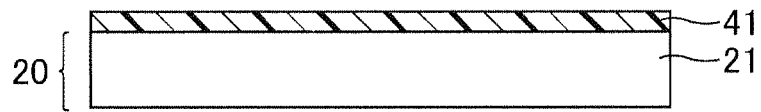
FIG. 3 is a schematic cross-sectional view for illustrating the method of producing a liquid crystal display device according to Embodiment 1, which is a schematic cross-sectional view after a conductive film forming step.
Figure 3:
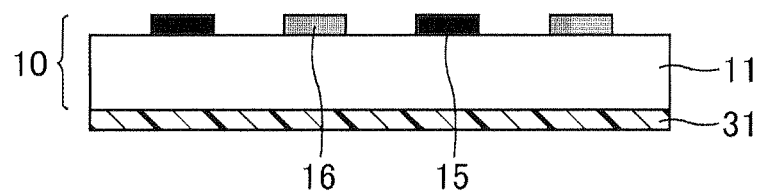

Furthermore, the method of producing a liquid crystal display device according to the present embodiment preferably includes, as shown in FIG. 3, a conductive film forming step of forming conductive films 31 and 41 respectively on the surfaces on the opposite side of the liquid crystal layer side of the array substrate 10 and the color filter substrate 20. Furthermore, the conductive film forming step may also be a step of forming only any one of the conductive film 31 and the conductive film 41.

Since the conductive films 31 and 41 are not removed even after the completion of the liquid crystal display device, the conductive films need to have transparency. Thus, the conductive films are formed by using transparent conductive film materials such as, for example, indium tin oxide (ITO), indium zinc oxide (IZO), zinc oxide (ZnO), and fluorine-doped tin oxide (FTO). Furthermore, the electrical characteristics of the conductive films 31 and 41 are not particularly limited, but it is preferable that the sheet resistance is 10 kΩ/□ (square) or less. The method of forming the conductive films 31 and 41 is not particularly limited, but the conductive films 31 and 41 are formed by, for example, a sputtering method.

[Horizontal Alignment Film Forming Step]

Figure 4:
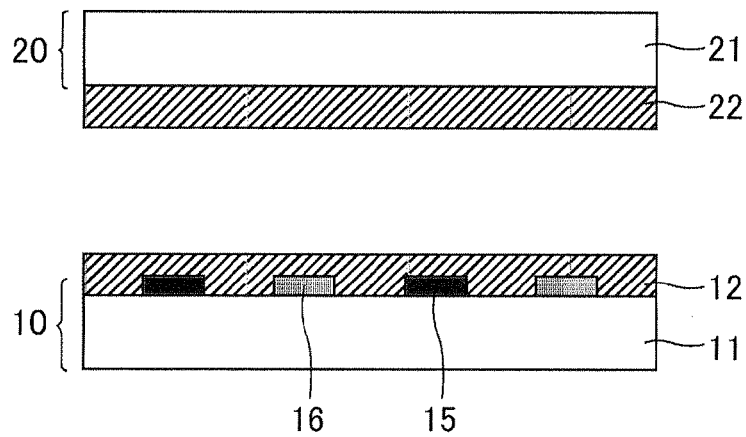
FIG. 4 is a schematic cross-sectional view for illustrating the method of producing a liquid crystal display device according to Embodiment 1, which is a schematic cross-sectional view after a horizontal alignment film forming step.

On the surface of the array substrate 10 where the pixel electrode 15, the common electrode 16 and the like are formed, a varnish prepared by mixing an alignment film material and a solvent is coated by spin coating. The varnish is also coated on the surface of the color filter substrate 20 where the color filter and the like are formed. Subsequently, the array substrate 10 and the color filter substrate 20 are dried in a furnace, the solvent in the varnish is volatilized, and thereby a coating film derived from the alignment film material (a precursor film of a horizontal alignment film) is formed on each of the array substrate 10 and the color filter substrate 20. Also, the coating films respectively formed on the array substrate 10 and the color filter substrate 20 are irradiated with light, and are subjected to an alignment treatment (photo-alignment treatment). In this manner, as shown in FIG. 4, horizontal alignment films 12 and 22 are formed. The alignment film material includes a photo-isomerizing type functional group, a photo-dimerizing type functional group, or both functional groups. Representative materials causing a photo-isomerization reaction or a photo-dimerization reaction include azobenzene derivatives, cinnamoyl derivatives, chalcone derivatives, cinnamate derivatives, coumarin derivatives, diarylethene derivatives, stilbene derivatives, and anthracene derivatives. The photo-isomerizing type or photo-dimerizing type material is preferably a cinnamate group or a derivative thereof. The benzene ring that is contained in these functional groups may be a heterocyclic ring. The alignment direction can be set to a desired direction by adjusting the kind of light irradiated, the irradiation time, the irradiation intensity, the kind of the photo-functional group, and the like. In addition, the photo-alignment treatment may be carried out, after bonding the array substrate 10 and the color filter substrate 20 in the liquid crystal layer forming step that will be described below, through the surface on the opposite side of the surface where the varnish is coated. As such, the photo-alignment treatment may be carried out before the liquid crystals are injected or may be carried out after the liquid crystals are injected, so long as the photo-alignment treatment is carried out before the liquid crystal layer thermal annealing step that will be described below. However, in the case of performing the photo-alignment treatment after the liquid crystals are injected, light which will not cause the PS polymerization that will be described below should be selected.

[Liquid Crystal Layer Forming Step]

A thermally curable sealing material 17 is applied on the outer periphery of the surface of the array substrate 10 where the horizontal alignment film 12 (or a coating film (a precursor film of the horizontal alignment film)) is formed. For convenience, in FIG. 5, the sealing material 17 is arranged at both ends of the schematic cross-sectional view, but in fact, the sealing material 17 is arranged on the outer periphery of the array substrate 10. At this time, a region where the sealing material 17 is not applied is provided on a portion of the outer periphery. On the other hand, beads are sprayed on the surface of the color filter substrate 20 where the horizontal alignment film 22 (or a coating film) is formed. Subsequently, the array substrate 10 and the color filter substrate 20 are bonded to each other. The array substrate 10 and the color filter substrate 20 thus bonded are heated in a furnace to cure the sealing material 17. Subsequently, in a vacuum, a liquid crystal composition is injected through the region where the sealing material 17 is not applied (injection port). Thereafter, the injection port is blocked with an ultraviolet-curable encapsulating material, and the encapsulating material is irradiated with ultraviolet rays to cure. In this manner, a liquid crystal layer 30 is formed between the array substrate 10 and the color filter substrate 20.

Figure 5:
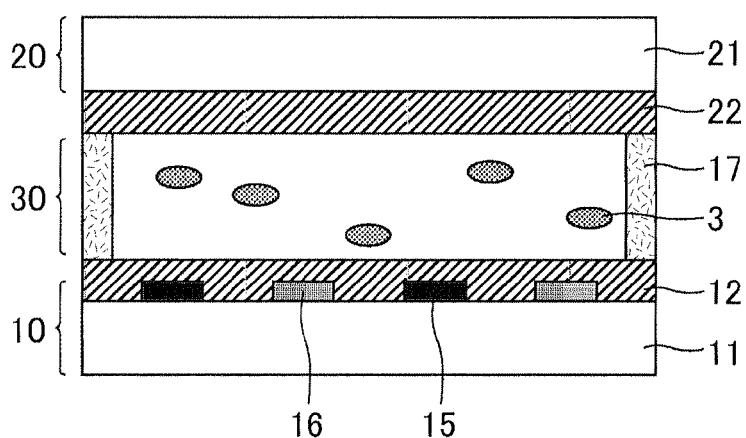
FIG. 5 is a schematic cross-sectional view for illustrating the method of producing a liquid crystal display device according to Embodiment 1, which is a schematic cross-sectional view after a liquid crystal layer forming step.

As shown in FIG. 5, the liquid crystal composition contains at least one kind of liquid crystal molecule and at least one kind of a polymerizable monomer 3. The liquid crystal molecules (liquid crystal material) contained in the liquid crystal composition are not particularly limited as long as the liquid crystal layer 30 exhibits a nematic phase, and the liquid crystal molecules may have positive anisotropy of dielectric constant (positive type) or may have negative anisotropy of dielectric constant (negative type). Furthermore, plural kinds of liquid crystal molecules may be included in order to secure reliability and to attempt an increase in the response time. By using plural kinds of liquid crystal molecules, the property values of liquid crystals such as the nematic phase-isotropic phase transition temperature Tni, elastic constant k, anisotropy of dielectric constant $\Delta\varepsilon$, and refractive index anisotropy $\Delta n$ can be adjusted to desired property values. Furthermore, from the viewpoint of accelerating the polymerization of the polymerizable monomer 3, it is preferable that the liquid crystal material contains liquid crystal molecules containing a multiple bond other than the conjugated double bonds of the benzene ring in the molecule structure, and specifically, it is preferable that liquid crystal molecules containing an ester group, an alkenyl group or a cyano group is included. Furthermore, it is preferable that liquid crystal molecules containing two or more kinds of these multiple bonds are included. The polymerizable monomer 3 contained in the liquid crystal composition is not particularly limited, but the polymerizable functional group is preferably an acrylate group, a methacrylate group, a vinyl group, a vinyloxy group or an epoxy group, and is more preferably a monomer which exhibits a photopolymerization reaction. The polymerizable monomer 3 is preferably included in an amount of 0.01 wt % to 2 wt % in the liquid crystal composition.

Furthermore, the liquid crystal layer 30 may be formed by a one drop fill process (ODF) that will be described below. That is, a sealing material 17 exhibiting ultraviolet curability and thermal curability is applied on the outer periphery of the surface of the array substrate 10 where the horizontal alignment film 12 (or a coating film) is formed, a liquid composition is dropped within the region surrounded by the sealing material on the array substrate 10, the array substrate 10 and the color filter substrate 20 are bonded to each other in a vacuum so as to interpose the sealing material and the liquid crystal composition, the region where the sealing material 17 is arranged is irradiated with ultraviolet rays to cure the sealing material, and thereby the liquid crystal layer 30 is formed. In addition, the sealing material 17 may be a material which involves at least heat in curing, but from the viewpoint of curing the sealing material more firmly and improving the quality of the liquid crystal display device, a sealing material having both thermal curability and ultraviolet curability is preferred. Furthermore, the sealing material 17 may also be applied on the color filter substrate 20, and the liquid crystal composition may also be dropped on the color filter substrate 20.

Figure 12:
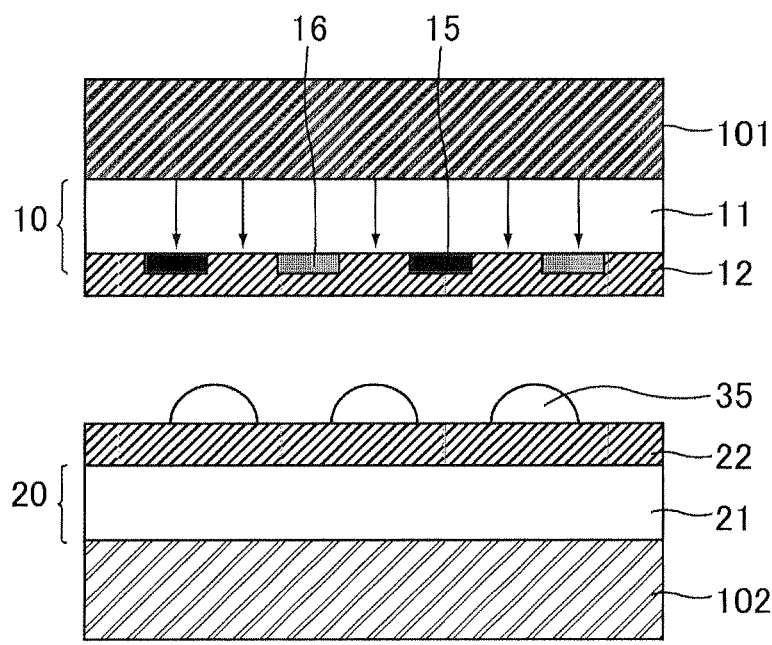
FIG. 12 is a schematic cross-sectional view for illustrating the method of producing a liquid crystal display device according to Embodiment 1, which is a schematic cross-sectional view illustrating a step of bonding an array substrate and a color filter substrate.

The bonding system that is generally used in the current mass production process for liquid crystal panels is ODF. The ODF process involves dropping of a liquid crystal composition on the substrate of the lower side (for example, color filter substrate), and bonding of the substrate of the lower side and the substrate of the upper side (for example, array substrate) to each other in a vacuum chamber, as described above. At this time, as an apparatus used to retain the upper substrate in a vacuum, an electrostatic chuck may be used. Vacuum adsorption cannot be applied in a vacuum, but since an electrostatic chuck is an apparatus which generates a high voltage and adsorbs a substrate by electrostatic interaction, the electrostatic chuck can be suitably used in a vacuum. FIG. 12 is a schematic view illustrating the state of performing bonding of a pair of substrates by using an electrostatic chuck. As shown in FIG. 12, when the array substrate 10 and the color filter substrate 20 are bonded to each other, a high voltage is applied to the array substrate 10 from the electrostatic chuck 101 (the arrow in the figure indicates the direction of the electric field). When the array substrate 10 is adsorbed to the electrostatic chuck, the color filter substrate 20 is arranged on a stage 102, and a liquid crystal composition 35 is dropped at a predetermined position on the color filter substrate 20. The electric field generated from the electrostatic chuck 101 grows toward the liquid crystal layer side (space between the substrates 10 and 20). For example, in a liquid crystal panel of the FFS mode, there is a layer of a pixel electrode or a common electrode that is formed to cover at least the display region, and the electric field from the electrostatic chuck is shielded by this electrode. Therefore, the electric field of the electrostatic chuck is not applied to the liquid crystal layer and the photo-alignment film, and the alignment of the liquid crystals is not disordered. On the other hand, in a liquid crystal panel of the IPS mode shown in FIG. 12, the electric field from the electrostatic chuck passes through between the pixel electrode 15 and the common electrode 16, the alignment of the liquid crystals is disordered, and there is a risk that display unevenness may occur. However, in the present embodiment, even if the alignment of the liquid crystals is disordered by the electric field from the electrostatic chuck, since the disorder in the alignment of the liquid crystals is resolved by the liquid crystal layer thermal annealing step that will be described below, the occurrence of display unevenness is suppressed. Therefore, in the present embodiment, an electrostatic chuck can be suitably used even in a liquid crystal panel of the IPS mode. Furthermore, from the same viewpoint, without being limited to a liquid crystal display device of the IPS mode, an electrostatic chuck can also be suitably used in a liquid crystal display device including an electrode including slits formed therein or an electrode formed in a fishbone shape.

[Liquid Crystal Layer Thermal Annealing Step]

After the liquid crystal layer 30 is formed, a liquid crystal cell (liquid crystal panel) is placed inside a furnace in which the temperature is set to a temperature higher by 10° C. or more than the liquid crystalline phase-isotropic phase transition temperature (nematic phase-isotropic phase transition temperature Tni) of the liquid crystal layer 30, and the liquid crystal layer 30 is thermally annealed. Furthermore, for example, the liquid crystal layer 30 may also be thermally annealed by placing the liquid crystal cell (liquid crystal panel) on a hot plate-like metal plate that is set to a temperature higher by 10° C. or more than Tni.

Thereby, the liquid crystal layer 30 turns into an isotropic phase, and the mobility of the ions constituting an electric double layer in the isotropic phase significantly increases. Thus, diffusion and detachment from the photo-alignment film proceed, and conductivity of the liquid crystals themselves increases. Furthermore, since a photo-alignment film having higher conductivity than conventional alignment films can easily conduct and transfer the charge of the electric double layer, it is speculated that the electric double layer within the liquid crystal layer 30 disappears.

Furthermore, in the case where the liquid crystal layer 30 is formed by ODF, when the liquid crystal layer 30 is thermally annealed, curing of the sealing material 17 is also promoted.

[PS Polymerization Step]

Figure 6:
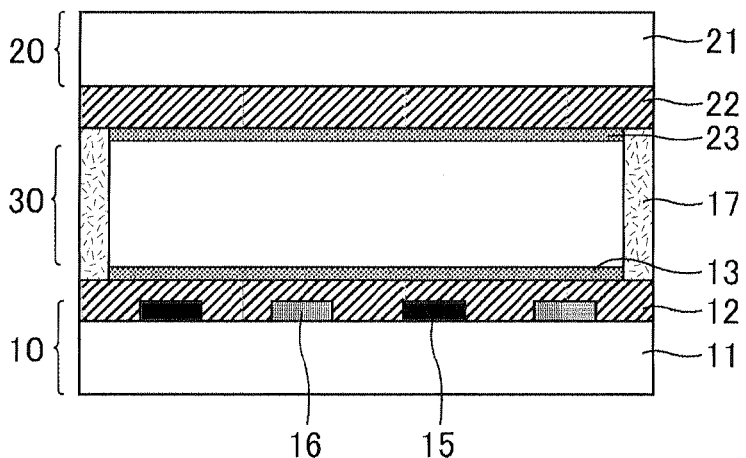
FIG. 6 is a schematic cross-sectional view for illustrating the method of producing a liquid crystal display device according to Embodiment 1, which is a schematic cross-sectional view after a liquid crystal layer thermal annealing step.
Figure 7:
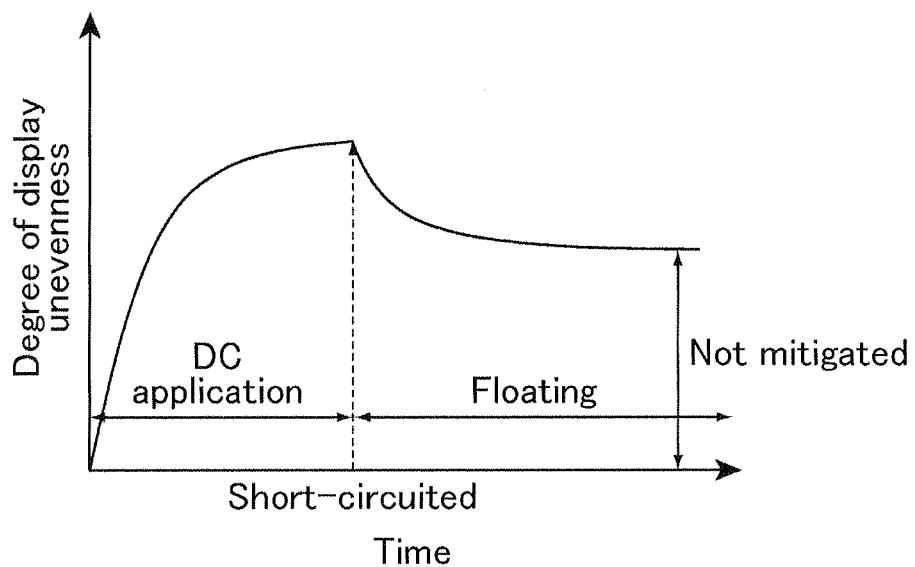
FIG. 7 is a graph illustrating the time transition of the degree of display unevenness in a liquid crystal display device including a horizontal photo-alignment film.

After the liquid crystal layer 30 is thermally annealed, for example, a certain amount of light is irradiated to the liquid crystal layer in a state in which no voltage is applied, and the polymerizable monomer 3 is polymerized. As illustrated in FIG. 6, PS layers (polymer layers) 13 and 23 are formed on the horizontal alignment films 12 and 22. By means of these PS layers 13 and 23, the alignment regulating force of the horizontal alignment films 12 and 22 can be uniformly maintained.

In addition, as shown in FIG. 6, the PS layers 13 and 23 are preferably formed on one surface of the horizontal alignment films 12 and 22, and more particularly, it is preferable that the PS layers 13 and 23 are formed densely to an approximately uniform thickness on one surface of the horizontal alignment films 12 and 22. Furthermore, the PS layers 13 and 23 may be formed in a dot shape on the horizontal alignment films 12 and 22. That is, the PS layers 13 and 23 may be formed on at least a portion of the surfaces of the horizontal alignment films 12 and 22, and even at this time, the alignment regulating force of the horizontal alignment films 12 and 22 can be uniformly maintained, and image sticking can be suppressed. Furthermore, the PS layers 13 and 23 may be formed on at least a portion of the surfaces of the horizontal alignment films 12 and 22, and then formed in a network form over the entirety of the liquid crystal layer 30.

In the PS polymerization step, irradiation of light is preferably carried out through the substrate that includes electrodes (array substrate). If light is irradiated through the color filter substrate side that includes a color filter, ultraviolet rays are absorbed by the color filter, and therefore, there is a risk that the efficiency may decrease.

In the present embodiment, an example of a liquid crystal display device of the IPS mode is described, but for example, even in the case of a liquid crystal display device of the TN mode, the polymerizable monomer 3 is polymerized in a state in which no voltage is applied.

It is preferable to carry out the process such that before the PS polymerization step, the pixel electrode 15 and the common electrode 16 are short-circuited lest the alignment of the liquid crystal molecules is disordered by an external field, the array substrate 10 and the color filter substrate 20 are subjected to an electric charge removal treatment by using a static eliminator (ionizer or soft X-rays), and the potentials of the front surface and the back surface of the liquid crystal cell are adjusted to the same potential.

Since it is important to carry out PS polymerization while the electric double layer in the liquid crystal layer 30 has disappeared, it is preferable that the liquid crystal layer 30 is thermally annealed immediately before the PS polymerization step.

[Other Steps]

A liquid crystal display device is produced by carrying out a step of subjecting the liquid crystal cell that has passed through the steps described above, to a step of bonding a polarizing plate and a step of affixing various drivers, a backlight and the like. A backlight is arranged on the back surface side of the liquid crystal cell, and is arranged so that light is transmitted through the array substrate 10, the liquid crystal layer 30, and the color filter substrate 20 in the stated order. In the step of bonding a polarizing plate, polarizing plates are respectively bonded to the surfaces on the opposite side of the liquid crystal layer side of the array substrate 10 and the color filter substrate 20. A pair of polarizing plates may be arranged in a parallel nicol state or may be arranged in a cross nicol state. However, from the viewpoint of satisfactorily maintaining the front contrast ratio, it is preferable that a pair of polarizing plates are arranged in a cross nicol state. That is, the liquid crystal display device produced by the present embodiment is preferably a normally black liquid crystal display device.

In addition, when the liquid crystal layer 30 is formed by ODF, and the sealing material is ultraviolet-curable, as described above, the sealing material is irradiated with ultraviolet rays, and the sealing material is cured. The timing of irradiating ultraviolet rays is not particularly limited, and the timing may be any time before the thermal annealing of the liquid crystal layer, simultaneously with the thermal annealing, or after the thermal annealing. When the sealing material is only ultraviolet-curable and is not thermally curable, in order to accelerate the polymerization induced by ultraviolet rays, the irradiation of ultraviolet rays is preferably carried out simultaneously with the thermal annealing, or before the liquid crystal cell returns to normal temperature (for example, immediately after annealing).

Figure 14:
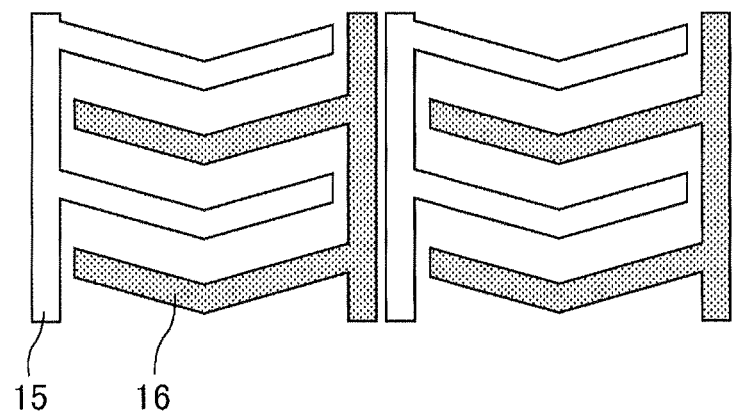
FIG. 14 is a schematic plane view illustrating the electrode arrangement of a liquid crystal display device produced according to the method of producing a liquid crystal display device according to Embodiment 1, and illustrates a case of the IPS mode.
Figure 15:
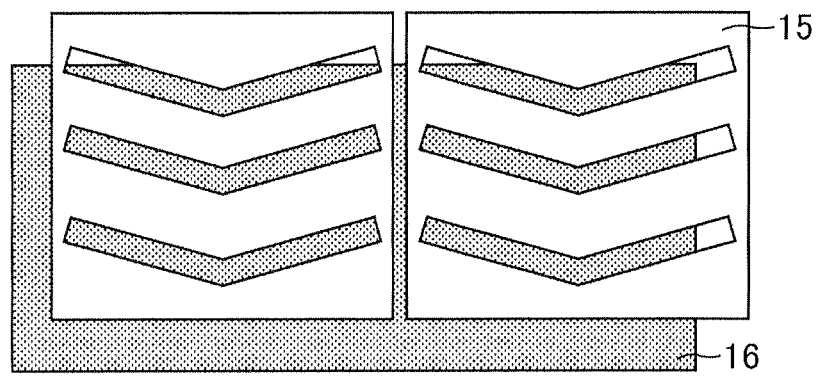
FIG. 15 is a schematic perspective view illustrating the electrode arrangement of a liquid crystal display device produced according to the method of producing a liquid crystal display device according to Embodiment 1, and illustrates a case of the FFS mode.

The liquid crystal display device produced in Embodiment 1 may be, for example, the IPS mode including the structure shown in FIG. 14, or may be the FFS mode including the structure shown in FIG. 15. In the case of the IPS mode shown in FIG. 14, the pixel electrode 15 and the common electrode 16 are formed from a pair of combteeth electrodes, and the electrodes are arranged in the form of being interlocked with each other in the same layer or in different layer. In the case of the FFS mode shown in FIG. 15, the pixel electrode 15 is an electrode including plural slits formed therein (slitted electrode), and the common electrode 16 is a flat plate-shaped electrode that covers the pixel region and is arranged at a position facing the slits. Also, FIG. 15 is a perspective view, but when the electrodes shown in FIG. 15 are viewed in a planar view, the common electrode 16 is arranged at positions facing the slits formed on the pixel electrode 15. In the case of the FFS mode, the pixel electrode 15 and the common electrode 16 are arranged in different layer, with an insulating layer interposed therebetween. In the case of the FFS mode, (a) the common electrode may be a slitted electrode, while the pixel electrode may be a flat plate-shaped electrode that covers the pixel region, and (b) one of the pixel electrode and the common electrode may be a combteeth electrode, while the other may be a flat plate-shaped electrode that covers the pixel region.

The method of producing a liquid crystal display device according to Embodiment 1 can be suitably used in the production of liquid crystal display devices that are used in TV panels, digital signage, medical monitors, electronic books, monitors for personal computers, panels for portable terminals, and the like.

The liquid crystal display device produced in Embodiment 1 may be any of a transmissive type, a reflective type, and a reflective-transmissive combination type. When the liquid crystal display device is of the reflective type, there is no need to use a backlight. When the liquid crystal display device is of the reflective type or the reflective-transmissive combination type, a reflective plate for reflecting external light is formed on the array substrate 10.

The liquid crystal display device produced in Embodiment 1 may be in the form of a color filter on array, in which a color filter is formed on the array substrate 10. Furthermore, the liquid crystal display device according to Embodiment 1 may be a monochrome display, or a field sequential color system, and in that case, there is no need of a color filter.

When the array substrate 10 includes a TFT, the material of the semiconductor layer is preferably an oxide semiconductor having high mobility, such as IGZO (indium gallium zinc oxide). When IGZO is used, the size of the TFT elements can be decreased as compared with the case of using amorphous silicon, and therefore, the oxide semiconductor is appropriate for high resolution liquid crystal displays. Particularly, in a system where high speed response is required as in the case of the field sequential color system, IGZO is suitably used.

When a liquid crystal display device produced in Embodiment 1 is decomposed, and a chemical analysis using gas chromatograph mass spectrometry (GC-MS), time-of-flight secondary ion mass spectrometry (TOF-SIMS) or the like is carried out, an analysis of the components of a horizontal photo-alignment film, an analysis of the components of the monomers present in a PS layer, and the like can be confirmed. Furthermore, the cross-sectional shape of a horizontal photo-alignment film and a liquid crystal cell including a PS layer can be confirmed by microscopic observation using a scanning transmission electron microscope (STEM), a scanning electron microscope (SEM) or the like.

Hereinafter, an example of actually producing a liquid crystal cell based on the method of producing a liquid crystal display device according to Embodiment 1 will be described.

Example 1

A glass substrate including a pair of combteeth electrodes (a pixel electrode and a common electrode) formed on the surface (combteeth electrode substrate) and a bare glass substrate (counter substrate) were prepared, and a polyvinyl cinnamate solution that serves as a material of a horizontal alignment film (varnish) was coated on each of the substrates by a spin coating method. As the material of the combteeth electrode, IZO was used. Furthermore, the electrode width L of the combteeth electrode was set to 3 µm, and the inter-electrode distance S was set to 9 µm. The polyvinyl cinnamate solution was prepared by dissolving polyvinyl cinnamate in an amount of 3 wt % in a solvent obtained by mixing equal amounts of N-methyl-2-pyrrolidone and ethylene glycol monobutyl ether.

The varnish was coated by a spin coating method, and then provisional drying was carried out at 90° C. for one minute. Subsequently, while nitrogen purging was carried out, burning was carried out at 200° C. for 60 minutes. The film thickness of the film obtained after burning was 100 nm.

Subsequently, the surface of each of the substrates was irradiated with linearly polarized ultraviolet rays as an alignment treatment from a direction normal to each of the substrates at an exposure dose of 5 J/cm² at a wavelength of 313 nm. Thereby, a horizontal photo-alignment film was formed on both of the substrates.

Subsequently, a thermally curable seal (HC1413EP; produced by Mitsui Chemical Corp.) was printed on the comb-teeth electrode substrate by using a screen plate. Furthermore, in order to adjust the thickness of the liquid crystal layer to 3.5 μm, beads having a diameter of 3.5 μm (SP-2035; produced by Sekisui Chemical Co., Ltd.) were sprayed on the counter substrate. The arrangement of these two kinds of substrates was adjusted so that the polarization directions of ultraviolet rays irradiated would coincide at the respective substrates, and these substrates were bonded to each other.

Next, while the bonded substrates were pressed at a pressure of 0.5 kgf/cm², the bonded substrates were heated at 200° C. for 60 minutes in a furnace that had been purged with nitrogen. Thus, the sealing material was cured.

To the cell produced by the method described above, a liquid crystal composition containing liquid crystal materials and a monomer was injected in a vacuum. Liquid crystal materials used were 4-cyano-4'-pentylbiphenyl, and trans-4-propyl-4'-vinyl-1,1'-bicyclohexane which is a liquid crystal containing an alkenyl group and accelerates polymerization of the monomer; and as a monomer, biphenyl-4,4'-diylbis(2-methyl acrylate) was used. Meanwhile, trans-4-propyl-4'-vinyl-1,1'-bicyclohexane was added in an amount of 5 wt % relative to the total amount of the liquid crystal composition, and biphenyl-4,4'-diylbis(2-methyl acrylate) was added in an amount of 1 wt % relative to the total amount of the liquid crystal composition. The phase transition temperature of the liquid crystal composition used in the present Example was 35° C.

The injection port of the cell to which the liquid crystal composition was injected was sealed by blocking the injection port with an ultraviolet-curable resin (TB3026E: produced by ThreeBond Co., Ltd.) and irradiating an ultraviolet ray. The ultraviolet ray irradiated at the time of sealing had a wavelength of 365 nm, and light was shielded in the pixel area so as to remove the influence of ultraviolet rays as much as possible. Also, at this time, inter-electrode short circuit was carried out so that the alignment of the liquid crystals would not be disordered by an external field, and the surface of the glass substrate was also subjected to an electric charge removal treatment.

Subsequently, in order to eliminate fluid flow alignment and alignment unevenness of the liquid crystals, a re-alignment treatment of heating the liquid crystal cell at 130° C. for 40 minutes and bringing the liquid crystal molecules into an isotropic phase was carried out. Thereby, a liquid crystal cell in which the liquid crystal molecules were uniaxially aligned within the plane of the substrate in a direction perpendicular to the polarization direction of the ultraviolet ray irradiated to the alignment film, was obtained.

Next, in order to perform a PS treatment of this liquid crystal cell, 2 J/cm² of an ultraviolet ray was irradiated with a blacklight (FHF32BLB: produced by Toshiba Corp.). Thereby, radical polymerization of biphenyl-4,4'-diylbis(2-methyl acrylate) proceeds.

The reaction system of the PS treatment (route of acrylate radical generation) in Example 1 is as follows.

First, as shown in the chemical reaction formula (2-1) described below, trans-4-propyl-4'-vinyl-1,1'-bicyclohexane (compound represented by the following chemical formula (1-1), hereinafter, indicated as CC), which is a liquid crystal material, is excited by ultraviolet irradiation.

[Chem. 2]

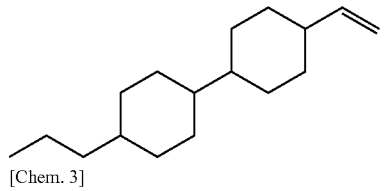
(1-1)

[Chem. 3]

(2-1)

Furthermore, as shown in the chemical reaction formula (4-1) described below, as a result of energy transfer from the excited trans-4-propyl-4'-vinyl-1,1'-bicyclohexane, the monomer biphenyl-4,4'-diylbis(2-methyl acrylate) (compound represented by chemical formula (3-1) shown below, hereinafter, abbreviated as M) is excited, and a radical is formed.

[Chem. 4]

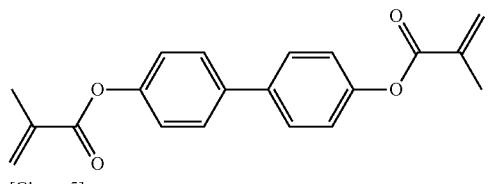
(3-1)

[Chem. 5]

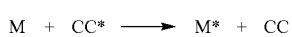
(4-1)

As such, it is speculated that trans-4-propyl-4'-vinyl-1,1'-bicyclohexane has high excitation efficiency, and the excitation energy is transferred between this compound and the monomer in the liquid crystals. Therefore, the polymerization probability of the monomer increases, and the PS conversion rate significantly increases.

The alignment of the liquid crystal molecules within the photo-aligned IPS cell (liquid crystal cell of Example 1) that had been produced by the method described above and subjected to a PS treatment was observed with a polarizing microscope, and similarly to the state before the PS treatment, the liquid crystal molecules were uniaxially aligned in a satisfactory manner.

As such, a liquid crystal display device (liquid crystal cell) in which the generation of an electric double layer does not occur as a result of a PS treatment was obtained. Since this liquid crystal display device does not undergo stripe-shaped alignment disorder that is typically seen in a liquid crystal display device of the IPS mode or the TN mode including a rubbing-treated alignment film, there is no light leakage, and the device has high contrast. Furthermore, along with an increase in size of the rubbing apparatus, it is difficult to perform uniform rubbing, and the yield decreases; however, in a photo-alignment apparatus, since it is easy to extend the region to be irradiated, large-sized glass substrates can be easily treated, and the yield is also high.

Subsequently, a liquid crystal cell was produced by the same method as in Example 1, except that a PS treatment was not carried out, and an image sticking test was carried out before the PS treatment. Specifically, first, stress was applied to the liquid crystal cell at DC 5 V for 5 minutes. After the application of stress, the alignment of the liquid crystal molecules did not return even if the pixel electrode and the common electrode were short-circuited, and significant polarization of the electric double layer was observed. In order to reduce this electric double layer, the liquid crystal cell was thermally annealed for 10 minutes on a hot plate in a floating state, subsequently a short circuit was carried out, and image sticking was observed. The temperature of thermal annealing was set to 25° C., 35° C., 40° C., 45° C., and 55° C.

When the temperature of thermal annealing was 25° C., 35° C., and 40° C., image sticking was visually observed. On the other hand, when the temperature of thermal annealing was 45° C. and 55° C., image sticking was not visually observed. The case in which image sticking was visually observed was rated as "poor", and the case in which image sticking could not be confirmed by visual inspection was rated as "good". The results are summarized in the following Table 1.

TABLE 1

| Annealing temperature | Image sticking |
|---|---|
| 25° C. | Poor |
| 35° C. | Poor |
| 40° C. | Poor |
| 45° C. | Good |
| 55° C. | Good |

The liquid crystalline phase-isotropic phase transition temperature of the liquid crystal composition used in Example 1 is 35° C. It was found from the image sticking test described above that when thermal annealing is carried out at 45° C., which is higher by 10° C. than the temperature of transition to the isotropic phase, reduction of the electric double layer dramatically progresses. This is thought to be because in the course of reducing the electric double layer of the horizontal photo-alignment film, the diffusion multiplier of impurity ions in the liquid crystal molecules markedly increases together with an increase in the mobility of the liquid crystal molecules when the liquid crystal molecules are brought into the isotropic phase, and the electric double layer of the horizontal photo-alignment film is rapidly reduced. Furthermore, it is generally said that the phase transition temperature of the liquid crystal molecules varies in the bulk state and at the liquid crystal-alignment film interface, and the phase transition temperature at the interface is higher. At 35° C. to 40° C., it is believed that the bulk is in the isotropic phase, but the interface is in the liquid crystalline phase, and reduction of the electric double layer is slow. Therefore, it is speculated that even if the temperature of the thermal annealing is higher than or equal to the phase transition temperature of the liquid crystal layer, when the temperature is lower than (phase transition temperature +10° C.), the problem of image sticking is not sufficiently solved. As described above, when thermal annealing is performed at a temperature higher by 10° C. or more than the phase transition temperature, the electric double layer formed by static charging could be removed, and the PS treatment could be carried out in a uniform liquid crystal alignment. Meanwhile, the timing of the thermal annealing is preferably after bonding, but the timing is more preferably immediately before the PS treatment.

Furthermore, also in a liquid crystal cell according to Example 1 in which a transparent conductive film is formed on the display surface side of the counter substrate, similarly, an electric double layer formed by static charging was removed by thermally annealing the liquid crystal cell at a temperature higher by 10° C. or more than the phase transition temperature, and the PS treatment could be carried out in a uniform liquid crystal alignment.

Example 2

Figure 8:
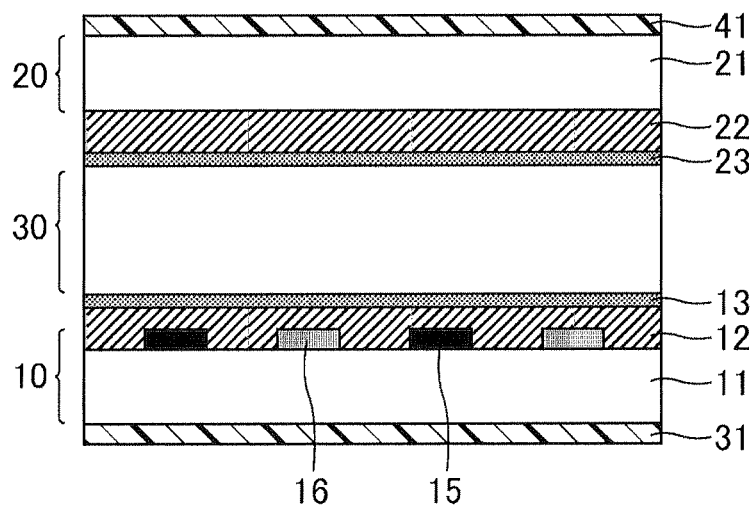
FIG. 8 is a schematic cross-sectional view of a liquid crystal display device according to Example 2.
Figure 9:
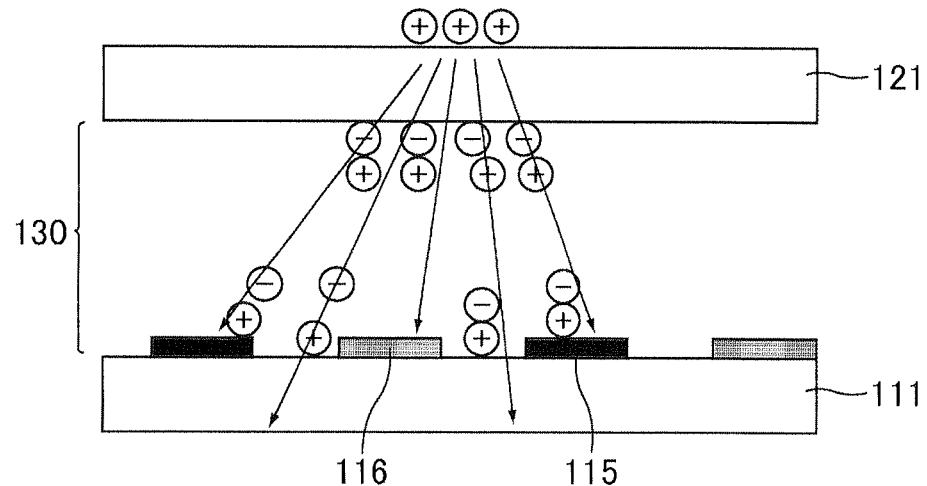
FIG. 9 is a schematic cross-sectional view of a liquid crystal display device illustrating an example of the situation of the generation of an electric double layer.
Figure 10:
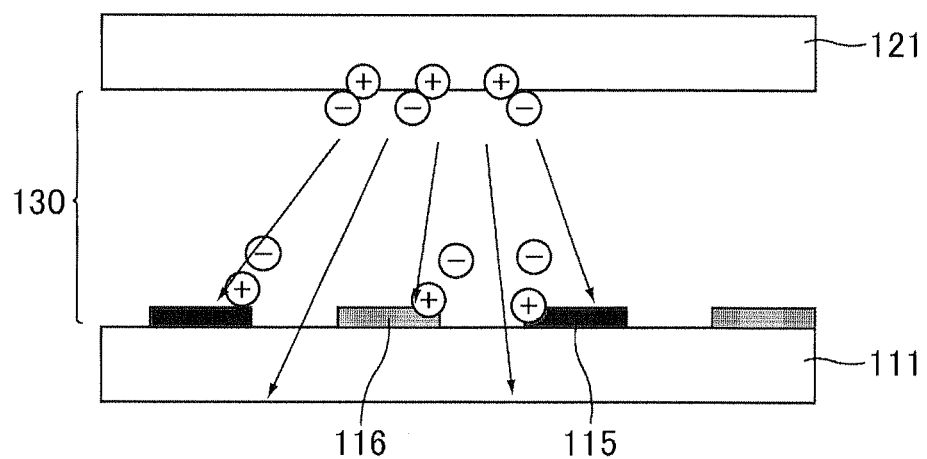
FIG. 10 is a schematic cross-sectional view of a liquid crystal display device illustrating another example of the situation of the generation of an electric double layer.
Figure 11:
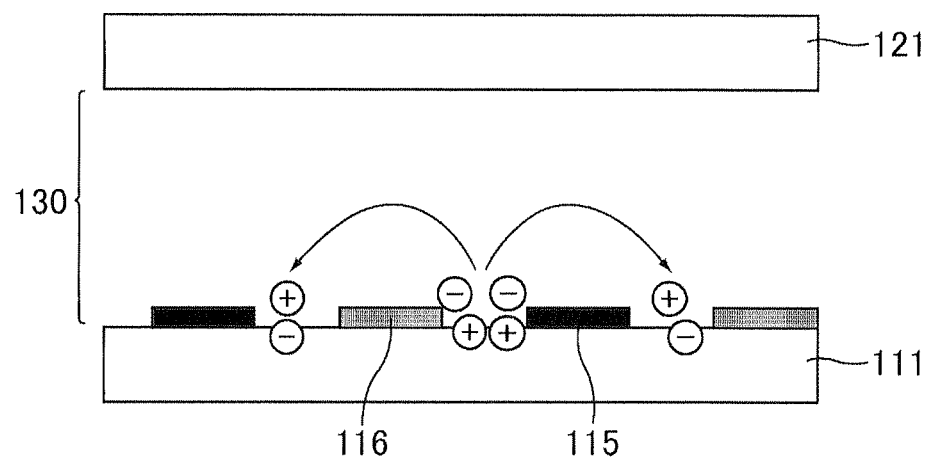
FIG. 11 is a schematic cross-sectional view of a liquid crystal display device illustrating still another example of the situation of the generation of an electric double layer.

As shown in FIG. 8, a liquid crystal cell was produced in the same manner as in Example 1, except that a conductive film formed from ITO was formed on the respective surfaces on the opposite side of the liquid crystal layer side of the combteeth electrode substrate and the counter substrate. The conductive films were formed by a sputtering method. After bonding of the substrates, the cell surface was rubbed with a rayon cloth before the PS treatment, but static electricity charging did not occur. That is, there was no occurrence of alignment disorder and image sticking before the PS treatment.

From the above results, it was found that when a conductive film is formed, the influence of static electricity can be suppressed, and the generation of an electric double layer can be suppressed. In addition, also for the liquid crystal display device according to Example 2, the PS treatment is essential, as will be described in detail below, in order to suppress image sticking.

When a conductive film is formed on the surface of a liquid crystal cell as in the configuration disclosed in Patent Document 1, static charging from a conveyance system or penetration of an external electric field is prevented. However, if the surface of a substrate (the array substrate or the color filter substrate) that is in contact with liquid crystals does not have the same potential, DC is applied to the liquid crystal layer after bonding. In this case, there occurs the formation of an electric double layer. Therefore, annealing by heating becomes a necessary means. The liquid crystal layer is brought into an isotropic phase by thermal annealing, the movement of charges is made easier, and the upper and lower substrates are subjected to an effect that is equivalent to short circuiting. Also, the problem of image sticking of the alignment film is solved by thermal annealing.

Example 3

A glass substrate having a pair of combteeth electrodes (a pixel electrode and a common electrode) formed on the surface (combteeth electrode substrate) and a bare glass substrate (counter substrate) were prepared, and a polyvinyl cinnamate solution (varnish) that served as a material of a horizontal alignment film was coated on each of the substrates by a spin coating method. As the material of the combteeth electrode, indium zinc oxide (IZO) was used. Furthermore, the electrode width L of the combteeth electrode was set to 3 μm, and the inter-electrode distance S was set to 9 μm. The polyvinyl cinnamate solution was prepared by dissolving polyvinyl cinnamate in an amount of 3 wt % in a solvent obtained by mixing equal amounts of N-methyl-2-pyrrolidone and ethylene glycol monobutyl ether.

The varnish was coated by a spin coating method, and then provisional drying was carried out at 90° C. for one minute. Subsequently, while nitrogen purging was carried out, burning was carried out at 200° C. for 60 minutes. The film thickness of the film obtained after burning was 100 nm.

Subsequently, the surface of each of the substrates was irradiated with linearly polarized ultraviolet rays as an alignment treatment from a direction normal to each of the substrates at an exposure dose of 5 J/cm$^2$ at a wavelength of 313 nm.

Subsequently, an ultraviolet-curable seal (WORLD ROCK 717; produced by Kyoritsu Chemical & Co., Ltd.) was printed on the combteeth electrode substrate by using a screen plate. This ultraviolet-curable seal is cured by ultraviolet irradiation, and is also cured by heating.

Next, a liquid crystal composition containing liquid crystal materials and a monomer was dropped within a region surrounded by the ultraviolet-curable seal on the combteeth electrode substrate. In order to make the liquid crystal layer uniform when the combteeth electrode substrate and the counter substrate were bonded, the amount of dropping of the liquid crystal composition and the dropping interval were set. As the liquid crystal material, 4-cyano-4'-pentyl-biphenyl, and trans-4-propyl-4'-vinyl-1,1'-bicyclohexane which is a liquid crystal containing an alkenyl group and accelerates polymerization of the monomer, were used. As the monomer, biphenyl-4,4'-diylbis(2-methyl acrylate) was used. In addition, trans-4-propyl-4'-vinyl-1,1'-bicyclohexane was added in an amount of 5 wt % relative to the total amount of the liquid crystal composition, and biphenyl-4,4'-diylbis(2-methyl acrylate) was added in an amount of 1 wt % relative to the total amount of the liquid crystal composition. The phase transition temperature of the liquid crystal composition used in the present Example was 35° C.

Subsequently, in order to adjust the thickness of the liquid crystal layer to 3.5 μm, beads having a diameter of 3.5 μm (SP-2035; produced by Sekisui Chemical Co., Ltd.) were sprayed on the counter substrate. The arrangement of these two kinds of substrates was adjusted so that the polarization directions of ultraviolet rays irradiated would coincide at the respective substrates, and these substrates were bonded to each other in a vacuum.

Next, the thermal-ultraviolet combined curable sealing material (WORLD ROCK, produced by Kyoritsu Chemical & Co., Ltd.) was irradiated with ultraviolet rays, and thus the sealing material was cured. The irradiated ultraviolet ray had a wavelength of 365 nm, the exposure dose was 2 J/cm$^2$, and light was shielded in the pixel area so as to remove the influence of ultraviolet rays as much as possible. Also, simultaneously with the ultraviolet irradiation to the sealing material, in order to accelerate seal curing and to eliminate fluid flow alignment and alignment unevenness of the liquid crystals, the liquid crystal cell was heated at 130° C. for 40 minutes. Furthermore, at this time, a short circuit was carried out between the electrodes so that the liquid crystal alignment would not be disordered by an external field, and the surface of the glass substrate was also subjected to an electric charge removal treatment. Thereby, a liquid crystal cell in which the liquid crystal molecules were uniaxially aligned within the plane of the substrate in a direction perpendicular to the polarization direction of the ultraviolet ray irradiated to the alignment film was obtained.

Next, in order to perform a PS treatment of this liquid crystal cell, 2 J/cm$^2$ of an ultraviolet ray was irradiated with a blacklight (FHF32BLB: produced by Toshiba Corp.). Thereby, radical polymerization of biphenyl-4,4'-diylbis(2-methyl acrylate) proceeds.

The liquid crystal display device according to Example 3 also had image sticking or display unevenness suppressed, similarly to the liquid crystal display device according to Example 1. Furthermore, also in the liquid crystal display device according to Example 3 in which a transparent conductive film was formed on the display surface side of the counter substrate, similarly to the liquid crystal display device according to Example 1, image sticking or display unevenness was suppressed. This is speculated to be because since the liquid crystal layer (Tni=35° C.) is thermally annealed in an isotropic phase by further applying heat (130° C., 40 minutes) at the time of ultraviolet irradiation to the ultraviolet-curable seal, the electric double layer, which is a problem to be solved of the present invention, is completely removed. In addition, since ultraviolet rays and heat are used together for the curing of the seal, the percentage of curing of the seal increases, and an effect that a high output power ultraviolet irradiating apparatus becomes unnecessary is obtained at the same time. Also, together with shortening of the process time of the series of processes, effects of reducing the capital investment and enhancing the quality of the panel are obtained.

Reference Example 1

Figure 13:
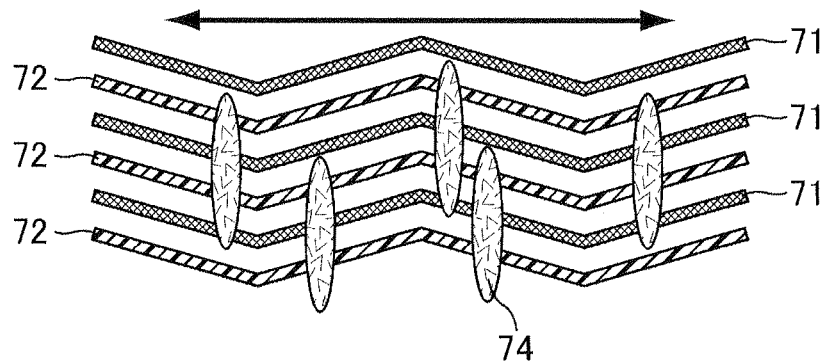
FIG. 13 is a schematic plane view illustrating a combteeth electrode substrate of Reference Example 1.

A glass substrate including a pair of combteeth electrodes which were transparent electrodes provided on the surface (combteeth electrode substrate) and a bare glass substrate (counter substrate) were prepared, and a polyvinyl cinnamate solution that served as a material of a horizontal alignment film was coated on each of the substrates by a spin coating method. FIG. 13 is a schematic plane view illustrating the combteeth electrode substrate of Reference Example 1. For the glass substrate, #1737 (produced by Corning, Inc.) was used. The combteeth electrodes are formed such that, as shown in FIG. 13, a common electrode 71 and a signal electrode 72 are extended approximately in parallel to each other, while the respective electrodes are formed in a zigzag form. Thereby, when an electric field is applied, the electric field vector is approximately perpendicular to the length direction of the electrodes, and therefore, a multi-domain structure is formed, while satisfactory viewing angle characteristics can be obtained. The two arrows in FIG. 13 indicate the directions of irradiation polarization (in the case of using negative type liquid crystal molecules 74). As the material of the combteeth electrodes, indium zinc oxide (IZO) was used. Furthermore, the electrode width L of the combteeth electrode was set to 3 μm, and the inter-electrode distance S was set to 9 μm. The polyvinyl cinnamate solution was prepared by dissolving polyvinyl cinnamate in an amount of 3 wt % in a solvent obtained by mixing equal amounts of N-methyl-2-pyrrolidone and ethylene glycol monobutyl ether.

The solution was coated by a spin coating method, and then provisional drying was carried out at 90° C. for one minute. Subsequently, while nitrogen purging was carried out, burning was carried out at 200° C. for 60 minutes. The film thickness of the film obtained after burning was 100 nm.

Subsequently, the surface of each of the substrates was irradiated with linearly polarized ultraviolet rays as an alignment treatment from a direction normal to each of the substrates at an exposure dose of 5 J/cm$^2$ at a wavelength of 313 nm. Meanwhile, as shown in FIG. 13, the angle formed by the length direction of the combteeth electrode and the direction of polarization at this time was set to ±15°.

Next, a thermally curable seal (HC1413EP; produced by Mitsui Chemical Corp.) was printed on the combteeth electrode substrate by using a screen plate. Furthermore, in order to adjust the thickness of the liquid crystal layer to 3.5 μm, beads having a diameter of 3.5 μm (SP-2035; produced by Sekisui Chemical Co., Ltd.) were sprayed on the counter substrate. The arrangement of these two kinds of substrates was adjusted so that the polarization directions of ultraviolet rays irradiated would coincide at the respective substrates, and these substrates were bonded to each other.

Next, while the bonded substrates were pressed at a pressure of 0.5 kgf/cm$^2$, the bonded substrates were heated at 200° C. for 60 minutes in a furnace that had been purged with nitrogen. Thus, the seal was cured.

To the cell produced by the method described above, a liquid crystal composition containing a liquid crystal material and a monomer was injected in a vacuum. As the liquid crystal material, a negative type liquid crystal composed of liquid crystal molecules containing multiple bonds in addition to benzene rings was used; and as the monomer, biphenyl-4,4'-diylbis(2-methyl acrylate) was used. Meanwhile, biphenyl-4,4'-diylbis(2-methyl acrylate) was added in an amount of 1 wt % relative to the total amount of the liquid crystal composition.

The injection port of the cell to which the liquid crystal composition was injected was sealed by blocking the injection port with an ultraviolet-curable resin (TB3026E: produced by ThreeBond Co., Ltd.) and irradiating an ultraviolet ray. The ultraviolet ray irradiated at the time of sealing had a wavelength of 365 nm, and light was shielded in the pixel area so as to remove the influence of ultraviolet rays as much as possible. Also, at this time, inter-electrode short circuit was carried out so that the alignment of the liquid crystals would not be disordered by an external field, and the surface of the glass substrate was also subjected to an electric charge removal treatment.

Subsequently, in order to eliminate fluid flow alignment of the liquid crystals, a re-alignment treatment of heating the liquid crystal cell at 130° C. for 40 minutes and bringing the liquid crystal molecules into an isotropic phase was carried out. Thereby, a liquid crystal cell in which the liquid crystal molecules were uniaxially aligned within the plane of the substrate in a direction perpendicular to the polarization direction of the ultraviolet ray irradiated to the alignment film, was obtained.

Next, in order to perform a PS treatment of this liquid crystal cell, 2 J/cm$^2$ of an ultraviolet ray was irradiated with a blacklight (FHF32BLB: produced by Toshiba Corp.). Thereby, radical polymerization of biphenyl-4,4'-diylbis(2-methyl acrylate) proceeds.

The reaction system of the PS treatment (route of acrylate radical generation) in Reference Example 1 is as follows.

(Reaction System 1)

First, as shown in the chemical reaction formula (2) described below, the monomer biphenyl-4,4'-diylbis(2-methyl acrylate) (compound represented by the following chemical formula (1), hereinafter, abbreviated as M) is excited by ultraviolet irradiation, and a radical is formed (the excitation state will be hereinafter indicated by symbol *)

[Chem. 6]

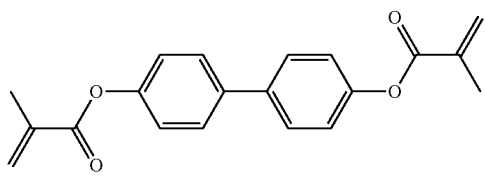

(1)

[Chem. 7]

(2)

(Reaction System 2)

On the other hand, as shown in the chemical reaction formula (4) described below, polyvinyl cinnamate (compound represented by the following chemical formula (3), hereinafter, abbreviated as PVC) as a photo-alignment film material is also excited by ultraviolet irradiation.

[Chem. 8]

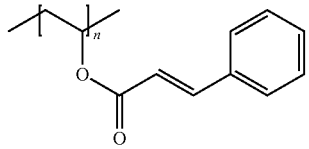

(3)

(Here, n represents a natural number.)

[Chem. 9]

(4)

Furthermore, as shown in the chemical reaction formula (5) described below, the monomer biphenyl-4,4'-diylbis(2-methyl acrylate) is excited by the energy transfer from the excited polyvinyl cinnamate, and a radical is formed.

[Chem. 10]

$$M+PVC^* \rightarrow M^*+PVC \qquad (5)$$

As a reason why the reactivity of the PS process increases, the following reason may be contemplated. In the process of polymerizing the monomer biphenyl-4,4'-diylbis(2-methyl acrylate) with ultraviolet rays, it is thought that an intermediate such as a radical accomplishes an important role. The intermediate is generated by ultraviolet rays, but the monomer is present in the liquid crystal composition in an amount of only 1 wt %, and the polymerization efficiency is not sufficient in the route of the above chemical reaction formula (2) only. If the PS treatment is achieved only by the route of the above chemical reaction formula (2), the monomer intermediates in an excited state need to come closer to each other in the liquid crystal bulk, and therefore, the polymerization probability itself is low. Also, since the monomer intermediate that has initiated polymerization needs to move to the vicinity of the alignment film interface after the polymerization reaction, the rate of PS treatment will be low. In this case, it is thought that the rate of PS treatment largely depends on temperature and the diffusion coefficient.

However, when a photo-alignment film is present, as shown in the chemical reaction formulae (4) and (5), similarly to the polyvinyl cinnamate in the present Reference Example, since the liquid crystal contains many double bonds as a photofunctional group, the photofunctional group is easily excited by ultraviolet rays, and it is contemplated that there is a transfer of excitation energy with the monomer in the liquid crystals. Furthermore, since this energy transfer is carried out in the vicinity of the alignment film interface, the probability of presence of an intermediate of the monomer in the vicinity of the alignment film interface greatly increases, and the polymerization probability and the rate of PS treatment significantly increase. Therefore, in this case, it is thought that the rate of PS treatment is not highly dependent on temperature and the diffusion coefficient.

Furthermore, in the photo-alignment film, electrons in a photoactive site are excited by light irradiation. In addition, in the case of a horizontal alignment film, since the photoactive site directly interacts with the liquid crystal layer, and thereby the liquid crystals are aligned, the intermolecular distance between the photoactive site and the polymerizable monomer is shorter as compared with that in a vertical alignment film, and the probability of the excitation energy transfer is markedly increased. In the case of a vertical alignment film, since hydrophobic groups are necessarily present between the photoactive site and the polymerizable monomer, the intermolecular distance becomes longer, and energy transfer does not easily occur. Therefore, it can be said that the PS process is particularly suitable for horizontal alignment films.

The alignment of the liquid crystal molecules within the photo-alignment IFS cell (liquid crystal cell of Reference Example 1) that had been produced by the method described above and subjected to the PS treatment was observed with a polarizing microscope, and similarly to the state before the PS treatment, the liquid crystal molecules were uniaxially aligned in a satisfactory manner. Furthermore, an electric field at a value greater than or equal to the threshold value was applied, and the liquid crystals were made to respond. The liquid crystals were aligned along the combteeth electrodes that were formed in a zigzag form, and due to the multidomain structure, satisfactory viewing angle characteristics could be obtained.

Subsequently, an evaluation of image sticking of the liquid crystal cell of Reference Example 1 was carried out. The evaluation method of image sticking is as follows. A region X and a region Y to which two different voltages could be applied were provided within the liquid crystal cell of Reference Example 1, and in the region X, a square wave at 6 V and 30 Hz was applied, while in the region Y, nothing was applied. The liquid crystal cell was left to stand for 48 hours in that state. Thereafter, a square wave at 2.4 V and 30 Hz was applied respectively to the region X and the region Y, and the luminance T(x) of the region X and the luminance T(y) of the region Y were respectively measured. For the luminance measurement, a digital camera (EOS KISS DIGITAL N EF-S18-55II U: produced by Canon, Inc.) was used. The value that serves as an index of image sticking, $\Delta T(x,y)$ (%), was calculated by the following formula.

$$\Delta T(x,y)=(|T(x)-(Ty)|/T(y))\times 100$$

As a result, the image sticking ratio $\Delta T$ of the liquid crystal cell of Reference Example 1 was only 24%.

As can be seen from Reference Example 1, severe image sticking that was attributable to the material of the photo-alignment film could be dramatically improved without impairing the alignment performance, by performing the PS treatment. In addition, since image sticking is dramatically improved, the ultraviolet exposure dose (time) in the PS treatment can also be decreased. In the production of liquid crystal panels, the throughput increases as the ultraviolet exposure dose (time) is decreased. Furthermore, since the ultraviolet irradiation apparatus can be made into smaller sizes, this leads to a reduction in the capital investment.

Comparative Example 1

In Comparative Example 1, a positive type liquid crystal 4-cyano-4'-pentylbiphenyl containing triple bonds was used as the liquid crystal material, and no monomer was added to the liquid crystal composition. Furthermore, the angle formed by the length direction of the combteeth electrode and the direction of polarization of the polarized ultraviolet rays in the photo-alignment treatment was set to ±75°, and ultraviolet irradiation with a blacklight was not carried out. While the same method as that used in Reference Example 1 was used for other conditions, an IPS liquid crystal cell of Comparative Example 1 was produced.

As a result, the image sticking ratio became 800% or higher, and severe image sticking occurred.

Example 4

An IPS liquid crystal cell of Example 4 was produced in the same manner as in Comparative Example 1, except that biphenyl-4,4'-diylbis(2-methyl acrylate) as a monomer was added to the positive type liquid crystal 4-cyano-4'-pentylbiphenyl, in an amount of 1 wt % relative to the total amount of the liquid crystal composition. That is, also in the present Example, thermal annealing (heating at 130° C. for 40 minutes) was carried out in order to eliminate fluid flow alignment of the liquid crystal molecules; however, the temperature of this thermal annealing was higher by 10° C. or more than the phase transition temperature of the liquid crystal composition used in the present Example. In the present Example, this thermal annealing is also a treatment for eliminating alignment unevenness. In the present Example, a liquid crystal cell in which the liquid crystal molecules were uniaxially aligned within the plane of the substrate in a direction perpendicular to the polarization direction of the ultraviolet ray irradiated to the alignment film, was obtained before the PS treatment. Furthermore, the alignment of the liquid crystal molecules within the liquid crystal cell after the PS treatment was observed with a polarizing microscope, and the liquid crystal molecules were uniaxially aligned in a satisfactory manner, similarly to the state before the PS treatment. Also, an electric field at a value greater than or equal to the threshold value was applied, and the liquid crystals were made to respond. The liquid crystals were aligned along the combteeth electrodes that were formed in a zigzag form, and due to the multidomain structure, satisfactory viewing angle characteristics could be obtained. Furthermore, the image sticking ratio was measured by the same method as that used in Comparative Example 1, and the image sticking ratio was 11%, while a significant improving effect was obtained.

The reaction system of the PS treatment (route of acrylate radical generation) in Example 4 is as follows.

(Reaction System 3)

First, as shown in the chemical reaction formula (6) described below, the monomer biphenyl-4,4'-diylbis(2-methyl acrylate) is excited by ultraviolet irradiation and a radical is formed.

[Chem. 11]

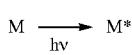    (6)

(Reaction System 4)

On the other hand, as shown in the reaction formula (7) described below, polyvinyl cinnamate, which is a photo-alignment film material, is also excited by ultraviolet irradiation.

[Chem. 12]

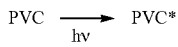    (7)

Furthermore, as shown in the chemical reaction formula (8) described below, the monomer biphenyl-4,4'-diylbis(2-methyl acrylate) is excited by the energy transfer from the excited polyvinyl cinnamate, and a radical is formed.

[Chem. 13]

$M+PVC^* \rightarrow M^*+PVC$    (8)

(Reaction System 5)

On the other hand, as shown in the chemical reaction formula (10) described below, 4-cyano-4'-pentylbiphenyl (compound represented by the following chemical formula (9), hereinafter, abbreviated as CB) which contains a triple bond in the molecule is also excited by ultraviolet irradiation.

[Chem. 14]

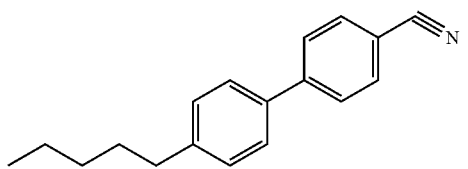    (9)

[Chem. 15]

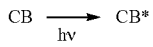    (10)

Furthermore, as shown in the chemical reaction formula (11) described below, the monomer biphenyl-4,4'-diylbis(2-methyl acrylate) is excited by the energy transfer from the excited 4-cyano-4'-pentylbiphenyl, and a radical is formed.

[Chem. 16]

$M+CB^* \rightarrow M^*+CB$    (11)

(Reaction System 6)

On the other hand, as shown in the chemical reaction formula (12) described below, polyvinyl cinnamate which is a photo-alignment film material is also excited by ultraviolet irradiation.

[Chem. 17]

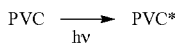    (12)

Furthermore, as shown in the chemical reactions formula (13) described below, the route by which 4-cyano-4'-pentylbiphenyl which is a liquid crystal material containing a triple bond in the molecule is excited by the energy transfer from the excited polyvinyl cinnamate, can also be contemplated.

[Chem. 18]

$CB+PVC^* \rightarrow CB^*+PVC$    (13)

The difference with Reference Example 1 is that a positive type liquid crystal 4-cyano-4'-pentylbiphenyl is used as the liquid crystal material. When Reference Example 1 is compared with Example 4, a greater improving effect can be obtained in Example 4. This is speculated to be because the cyano group in the liquid crystal molecule has a triple bond. Since the double bonds in a benzene ring that does not have a substituent do not contribute to the reaction, it may be concluded that the triple bond of the cyano group plays an important role.

As such, when the liquid crystal molecule contains a multiple bond, image sticking is improved by the PS treatment. As a reason for this, the following reason can be contemplated. As shown in the chemical reaction formulae (4) and (5) described above, an excited intermediate of the monomer of Reference Example 1 is generated by ultraviolet rays and energy transfer from the photo-alignment film. However, since 4-cyano-4'-pentylbiphenyl contains the triple bond of the cyano group in the molecule, the liquid crystal molecule itself can be excited to a radical or the like. Furthermore, in addition to the reaction systems represented by the chemical reaction formulae (4) and (5), for example, it is thought that the PS treatment is accelerated by the same generation route as that employed in the chemical reactions schemes (10) and (11). Furthermore, as shown in the chemical reaction formulae (12) and (13), a route by which energy is transferred from the excited photo-alignment film to the liquid crystal molecules, and the liquid crystal molecules are excited, may be contemplated. That is, since the monomer is excited by more various routes than in Reference Example 1, this contributes to further promotion of the PS treatment.

Example 5

A cell was produced in the same manner as in Example 4, except that trans-4-propyl-4'-vinyl-1,1'-bicyclohexane as a liquid crystalline molecule was added to the positive type liquid crystal material 4-cyano-4'-pentylbiphenyl in an amount of 37 wt % relative to the total amount of the liquid crystal composition, and biphenyl-4,4'-diylbis(2-methyl acrylate) as a monomer was added in an amount of 1 wt % relative to the total amount of the liquid crystal composition. That is, in the present Example as well, the thermal annealing (heating at 130° C. for 40 minutes) that was conducted to eliminate fluid flow alignment of the liquid crystal molecules was carried out, but the temperature of this thermal annealing was higher by 10° C. or more than the phase transition temperature of the liquid crystal composition used in the present Example. In the present Example, this thermal annealing also serves as a treatment for eliminating alignment unevenness. In the present Example, a liquid crystal cell in which the liquid crystal molecules were uniaxially aligned within the plane of the substrate in a direction perpendicular to the polarization direction of the ultraviolet ray irradiated to the alignment film, was obtained before the PS treatment. Furthermore, the alignment of the liquid crystal molecules within the liquid crystal cell after the PS treatment was observed with a polarizing microscope, and the liquid crystal molecules were uniaxially aligned in a satisfactory manner. Also, an electric field at a value greater than or equal to the threshold value was applied, and the liquid crystals were made to respond. The liquid crystals were aligned along the combteeth electrodes that were formed in a zigzag form, and due to the multidomain structure, satisfactory viewing angle characteristics could be obtained. Furthermore, the image sticking ratio was measured by the same method as that used in Example 4, and the image sticking ratio was only 3%. Therefore, according to Example 5, it was confirmed that the problem of image sticking was further improved as compared to Example 4.

The reaction system of the PS treatment (route of acrylate radical generation) in Example 5 is as follows.

First, as shown in the chemical reaction formula (15) described below, trans-4-propyl-4'-vinyl-1,1'-bicyclohexane (compound represented by the following chemical formula (14), hereinafter, abbreviated as CC) as a liquid crystal material is excited by ultraviolet irradiation.

[Chem. 19]

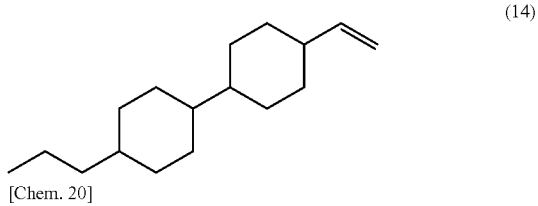

(14)

[Chem. 20]

(15)

Furthermore, as shown in the chemical reaction formula (16) described below, biphenyl-4,4'-diylbis(2-methyl acrylate) as a monomer is excited by energy transfer from the excited trans-4-propyl-4'-vinyl-1,1'-bicyclohexane, and a radical is formed.

[Chem. 21]

$$M+CC^* \to M^*+CC \quad (16)$$

As shown in the chemical reaction formulae (15) and (16), liquid crystal molecules containing multiple bonds have the problem of image sticking dramatically improved by the PS treatment. Particularly, liquid crystal molecules containing double bonds exhibit a significant effect. That is, it can be said that trans-4-propyl-4'-vinyl-1,1'-bicyclohexane has higher excitation efficiency caused by ultraviolet rays than 4-cyano-4'-pentylbiphenyl that was used in Reference Example 1 and Examples 4 and 5, and the efficiency of energy transfer from the photo-alignment film or between the liquid crystal molecules is high. The difference in the reactivity between two molecules is the difference between whether the molecule contains a triple bond of a cyano group, or whether the molecule contains an alkenyl group. In other words, it can be said that a double bond has higher reaction efficiency compared to a triple bond.

Example 6

An IPS liquid crystal cell was produced in the same manner as in Example 5, except that the blacklight irradiation time was changed to ⅙ of the irradiation time employed in Example 5, and the exposure dose was changed to 350 mJ/cm². The alignment of the liquid crystal molecules was observed with a polarizing microscope, and the liquid crystal molecules were uniaxially aligned in a satisfactory manner before as well as after the PS treatment. Furthermore, an electric field at a value greater than or equal to the threshold value was applied, and the liquid crystals were made to respond. The liquid crystals were aligned along the combteeth electrodes that were formed in a zigzag form, and due to the multidomain structure, satisfactory viewing angle characteristics could be obtained. Furthermore, the image sticking ratio was measured by the same method as that used in Example 4, and the image sticking ratio was only 8%. Therefore, it was found that even if the energy and time of ultraviolet irradiation in the PS process were reduced, a sufficient image sticking preventing effect was obtained.

Example 7

Example 7 is a production example for a liquid crystal cell of the FFS mode. A TFT substrate including a slitted electrode (an electrode including plural slits formed therein) and a flat plate-shaped electrode (a planar electrode) provided on the surface (hereinafter, also called an FFS substrate) and a counter substrate including a color filter were prepared, and a polyvinyl cinnamate solution which served as a material of a horizontal alignment film was coated on each of the substrates by a spin coating method. For the glass plate, #1737 (produced by Corning Corp.) was used. As the material of the slitted electrode, indium tin oxide (ITO) was used. The electrode width L of the slitted electrode was set to 5 µm, and the inter-electrode distance S, that is, the width of the slit, was set to 5 µm. The polyvinyl cinnamate solution was prepared by dissolving polyvinyl cinnamate in an amount of 3 wt % in a solvent obtained by mixing equal amounts of N-methyl-2-pyrrolidone and ethylene glycol monobutyl ether.

The solution was coated by a spin coating method, and then provisional drying was carried out at 90° C. for one minute. Subsequently, while nitrogen purging was carried out, burning was carried out at 200° C. for 60 minutes. The film thickness of the film obtained after burning was 100 nm.

Subsequently, the surface of each of the substrates was irradiated with linearly polarized ultraviolet rays as an alignment treatment from a direction normal to each of the substrates at an exposure dose of 5 J/cm² at a wavelength of 313 nm. In addition, the angle formed by the length direction of the combteeth electrode and the direction of polarization at this time was adjusted to 7°.

Subsequently, a thermally curable seal (HC1413EP; produced by Mitsui Chemical Corp.) was printed on an FFS substrate by using a screen plate. Furthermore, in order to adjust the thickness of the liquid crystal layer to 3.5 µm, beads having a diameter of 3.5 µm (SP-2035; produced by Sekisui Chemical Co., Ltd.) were sprayed on the counter substrate. The arrangement of these two kinds of substrates was adjusted so that the polarization directions of ultraviolet rays irradiated would coincide at the respective substrates, and these substrates were bonded to each other.

Next, while the bonded substrates were pressed at a pressure of 0.5 kgf/cm², the bonded substrates were heated at 200° C. for 60 minutes in a furnace that had been purged with nitrogen. Thus, the seal was cured.

To the cell produced by the method described above, a liquid crystal composition containing a liquid crystal material and a monomer was injected in a vacuum. As the liquid crystal composition, a mixture obtained by adding trans-4-propyl-4'-vinyl-1,1'-bicyclohexane was added to 4-cyano-4'-pentylbiphenyl, which is a positive type liquid crystal material, in an amount of 37 wt % relative to the total amount of the liquid crystal composition, and as a monomer, a mixture obtained by adding biphenyl-4,4'-diylbis(2-methyl acrylate) to 4-cyano-4'-pentylbiphenyl in an amount of 1 wt % relative to the total liquid crystal composition, were used.

The injection port of the cell to which the liquid crystal composition was injected was sealed by blocking the injection port with an ultraviolet-curable resin (TB3026E: produced by ThreeBond Co., Ltd.) and irradiating an ultraviolet ray. The ultraviolet ray irradiated at the time of sealing had a wavelength of 365 nm, and light was shielded in the pixel area so as to remove the influence of ultraviolet rays as much as possible. Also, at this time, inter-electrode short circuit was carried out so that the alignment of the liquid crystals would not be disordered by an external field, and the surface of the glass substrate was also subjected to an electric charge removal treatment.

Subsequently, in order to eliminate fluid flow alignment and alignment unevenness of the liquid crystals, a re-alignment treatment of heating the liquid crystal panel at 130° C. for 40 minutes and bringing the liquid crystal molecules into an isotropic phase was carried out. The temperature of this thermal annealing was higher by 10° C. than the phase transition temperature of the liquid crystal composition used in the present Example. Thereby, a liquid crystal cell in which the liquid crystal molecules were uniaxially aligned within the plane of the substrate in a direction perpendicular to the polarization direction of the ultraviolet ray irradiated to the alignment film, was obtained.

Subsequently, in order to reproduce the bonding of the substrates in an actual production process, the FFS panel was placed such that an electrostatic chuck (produced by Tomoegawa Co., Ltd.) would be brought into contact on the TFT substrate side. A voltage of 1.7 kV was applied to the electrostatic chuck, it was checked that the FFS panel was sufficiently adsorbed, and the liquid crystal cell was maintained for 10 minutes.

Next, in order to perform a PS treatment of this liquid crystal cell, 2 J/cm$^2$ of an ultraviolet ray was irradiated with a blacklight (FHF32BLB: produced by Toshiba Corp.). Thereby, polymerization of biphenyl-4,4'-diylbis(2-methyl acrylate) proceeds.

Assembling of a panel was carried out by using the liquid crystal cell of Example 7, and a liquid crystal display panel which exhibited a uniform alignment and was free of unevenness could be obtained, without any image sticking in the liquid crystal display.

Ultraviolet irradiation for the PS treatment in Examples 1 to 7 is preferably carried out from the array substrate side where electrodes are present. If irradiation is achieved from the counter substrate side where a color filter is present, ultraviolet rays are absorbed by the color filter.

The present application claims priority to Patent Application Nos. 2010-231924 filed in Japan on Oct. 14, 2010, 2011-084755 filed in Japan on Apr. 6, 2011, and 2011-096524 filed in Japan on Apr. 22, 2011 under the Paris Convention and provisions of national law in a designated State, the entire contents of which are hereby incorporated by reference.

REFERENCE SIGNS LIST

3: Polymerizable monomer
10: Array substrate
11, 21, 111, 121: Insulating transparent substrate
12, 22: Horizontal alignment film
13, 23: PS layer (polymer)
15, 115: Pixel electrode
16, 71, 116: Common electrode
17: Sealing material
20: Color filter substrate
30, 130: Liquid crystal layer
31, 41: Conductive film
35: Liquid crystal composition
72: Signal electrode
74: Negative type liquid crystal molecule
101: Electrostatic chuck
102: Stage

The invention claimed is:

1. A method of producing a liquid crystal display device comprising the steps of:
   (1) forming a liquid crystal layer containing a liquid crystal composition having a nematic phase and containing a polymerizable monomer between a first substrate and a second substrate;
   (2) thermally annealing the liquid crystal layer at a temperature higher by 10° C. or more than the liquid crystalline phase-isotropic phase transition temperature of the liquid crystal layer;
   (3) forming horizontal alignment films to which the alignment treatment is performed by light irradiation on the first substrate and the second substrate by the time of the step (2); and
   (4) polymerizing the polymerizable monomer after the step (2),
   wherein the horizontal alignment films are photo-alignment films containing polyvinyl cinnamate, and
   the liquid crystal layer comprises liquid crystal molecules containing a multiple bond other than the conjugated bonds of a benzene ring in the molecule structure.

2. The method of producing a liquid crystal display device according to claim 1,
   wherein in the step (1), a sealing material which involves heat in curing is applied on at least one of the first substrate and the second substrate, a material of the liquid crystal layer is dropped on the first substrate or the second substrate, and the first substrate and the second substrate are bonded to each other so that the sealing material and the material are interposed therebetween, to thereby form the liquid crystal layer; and
   in the step (2), the liquid crystal layer is thermally annealed, and at the same time, the sealing material is cured.

3. The method of producing a liquid crystal display device according to claim 1 further comprising the step of:
   subjecting the first substrate and/or the second substrate to an electric charge removal treatment by using a static eliminator equipment.

4. The method of producing a liquid crystal display device according to claim 1 further comprising the step of:
   forming a conductive film on the surface on the opposite side of the liquid crystal layer side of at least one of the first substrate and the second substrate.

5. The method of producing a liquid crystal display device according to claim 1,
   wherein the method of producing a liquid crystal display device is a method of producing a liquid crystal display device of a horizontal electric field system.

6. The method of producing a liquid crystal display device according to claim 1, wherein the polymerizable monomer is a photopolymerizable monomer and is polymerized by light irradiation.

7. The method of producing a liquid crystal display device according to claim 1,
wherein the multiple bond is a double bond.

8. The method of producing a liquid crystal display device according to claim 7,
wherein the double bond is contained in an ester group.

9. The method of producing a liquid crystal display device according to claim 7,
wherein the double bond is contained in an alkenyl group.

10. The method of producing a liquid crystal display device according to claim 1,
wherein the multiple bond is a triple bond.

11. The method of producing a liquid crystal display device according to claim 10,
wherein the triple bond is contained in a cyano group.

12. The method of producing a liquid crystal display device according to claim 1,
wherein the liquid crystal molecules contain two or more kinds of multiple bonds.

13. The method of producing a liquid crystal display device according to any claim 2 further comprising the step of:
forming a pixel electrode and a common electrode on the first substrate or the second substrate,
wherein a gap is present between the pixel electrode and the common electrode in a planar view, and
in the step (1), the first substrate or the second substrate is adsorbed to an electrostatic chuck in a vacuum, and thereby the first substrate and the second substrate are bonded to each other.

14. The method of producing a liquid crystal display device according to claim 13,
wherein the pixel electrode and the common electrode are a pair of combteeth electrodes.

15. The method of producing a liquid crystal display device according to claim 13,
wherein the pixel electrode and the common electrode are transparent electrodes.

16. The method of producing a liquid crystal display device according to claim 1,
wherein the first substrate or the second substrate includes a pixel electrode and a common electrode,
one of the pixel electrode and the common electrode includes plural linear portions that are arrayed with gaps between them within a pixel, and
the other of the pixel electrode and the common electrode faces the gaps.

* * * * *